(12) United States Patent
Behravan et al.

(10) Patent No.: US 9,860,907 B2
(45) Date of Patent: Jan. 2, 2018

(54) FIRST AND SECOND BASE STATIONS AND METHODS PERFORMED THEREIN

(71) Applicant: Telefonaktiebolaget L M Ericsson (publ), Stockholm (SE)

(72) Inventors: Ali Behravan, Stockholm (SE); Imadur Rahman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/910,734

(22) PCT Filed: Aug. 11, 2014

(86) PCT No.: PCT/SE2014/050932
§ 371 (c)(1),
(2) Date: Feb. 8, 2016

(87) PCT Pub. No.: WO2015/020607
PCT Pub. Date: Feb. 12, 2015

(65) Prior Publication Data
US 2016/0302218 A1    Oct. 13, 2016

Related U.S. Application Data

(60) Provisional application No. 61/863,967, filed on Aug. 9, 2013.

(51) Int. Cl.
*H04W 72/12* (2009.01)
*H04W 72/04* (2009.01)
(Continued)

(52) U.S. Cl.
CPC ....... *H04W 72/1205* (2013.01); *H04L 5/0055* (2013.01); *H04L 5/0091* (2013.01);
(Continued)

(58) Field of Classification Search
CPC ........... H04W 72/0446; H04W 72/042; H04W 72/1205; H04W 76/025; H04L 5/0055; H04L 5/0091
See application file for complete search history.

(56) References Cited

U.S. PATENT DOCUMENTS

| 2013/0155915 | A1 | 6/2013 | Park et al. | |
| 2013/0286904 | A1* | 10/2013 | Xu | ............... H04L 5/001 370/280 |

(Continued)

FOREIGN PATENT DOCUMENTS

| EP | 2 557 878 A1 | 2/2013 |
| RU | 2 481 737 | 9/2009 |

(Continued)

OTHER PUBLICATIONS

PCT Written Opinion of the International Searching Authority for International application No. PCT/SE2014/050932, dated Nov. 21, 2014.
(Continued)

*Primary Examiner* — Jianye Wu
(74) *Attorney, Agent, or Firm* — Baker Botts, LLP

(57) ABSTRACT

According to embodiments herein a method, performed by a first base station (12), is provided for handling scheduling of Time Division Duplex, TDD, uplink and/or downlink subframes for a wireless terminal (10), which wireless terminal (10) is in dual connectivity with a first cell served by said first base station (12) and a second cell served by a second base station (13). The first base station 12: identifies a subframe in which an uplink/downlink scheduling conflict will occur between the first cell and the second cell due to a difference between a TDD configuration of the first cell and a TDD configuration of the second cell; determines a scheduling for the identified subframe based on at least one scheduling parameter; and sends, to the second base station (Continued)

(13), a scheduling instruction comprising the determined scheduling for the identified subframe.

40 Claims, 14 Drawing Sheets

(51) Int. Cl.
  *H04L 5/00* (2006.01)
  *H04W 76/02* (2009.01)
(52) U.S. Cl.
  CPC ..... *H04W 72/042* (2013.01); *H04W 72/0446* (2013.01); *H04W 76/025* (2013.01)

(56) References Cited

U.S. PATENT DOCUMENTS

| | | | | |
|---|---|---|---|---|
| 2015/0055632 | A1* | 2/2015 | Gou | H04W 56/0015 370/336 |
| 2015/0351117 | A1* | 12/2015 | Rahman | H04L 5/1469 370/252 |
| 2016/0302218 | A1* | 10/2016 | Behravan | H04W 72/0446 |

FOREIGN PATENT DOCUMENTS

| | | |
|---|---|---|
| WO | WO 2008 156402 | 12/2008 |
| WO | WO 2009 065053 | 5/2009 |
| WO | WO 2012 095745 A1 | 7/2012 |
| WO | WO 2013/063807 A1 | 5/2013 |
| WO | WO 2014/109688 A1 | 7/2014 |

OTHER PUBLICATIONS

3GPP TSG RAN WG1 Meeting #72bis; Chicago, USA; Source: Huawei, HiSilicon; Title: Feasibility and benefits of radio-interface based synchronization mechanisms for operation efficiency improvement (R1-131164), Apr. 15-19, 2013.

3GPP TSG-RAN WG2 Meeting #82; Fukuoka, Japan; Source: Fujitsu; Title: The challenges of dual connectivity for single RX/TX capable UEs (R2-131856), May 20-24, 2013.

3GPP TSG-RAN WG1 Meeting #72; St. Julian's, Malta; Source: Nokia, Nokia Siemens Networks; Title: Discussion on UL-DL interference mitigation for dynamic TDD UL-DL reconfigurations (R1-130487), dated Jan. 28-Feb. 1, 2013.

Extended European Search Report for Application No. EP 14 83 4086—dated Feb. 22, 2017.

Russian Office Action issued for Application No. 2016108036—dated Mar. 15, 2017.

Russian Patent Office, Russian Notice of Allowance, 2016108036/07(012696), dated Jun. 13, 2017, 17 pages.

\* cited by examiner

FIRST AND SECOND BASE STATIONS AND METHODS PERFORMED THEREIN

PRIORITY

This nonprovisional application is a U.S. National Stage Filing under 35 U.S.C. §371 of International Patent Application Serial No. PCT/SE2014/050932 filed Aug. 11, 2014, and entitled "First And Second Base Stations And Methods Performed Therein" which claims priority to U.S. Provisional Patent Application No. 61/863,967 filed Aug. 9, 2013, both of which are hereby incorporated by reference in their entirety.

TECHNICAL FIELD

Embodiments herein relate to a first and second base station and methods therein. In particular embodiments relate to handling scheduling of TDD uplink or downlink subframes to a wireless terminal.

BACKGROUND

In a typical wireless communication network, wireless terminals, also known as mobile stations and/or user equipments (UEs), communicate via a Radio Access Network (RAN) to one or more core networks. The RAN covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole wireless communication network is also broadcasted in the cell. One base station may have one or more cells. A cell may be a downlink (DL) and/or uplink (UL) cell. A DL cell being a cell that a wireless terminal is connected to primarily for communications in the DL, and an UL cell being a cell that a wireless terminal is connected to primarily for communications in the UL. The base stations communicate over the air interface operating on radio frequencies with the wireless terminals within range of the base stations.

A Universal Mobile Telecommunications System (UMTS) is a third generation wireless communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for wireless terminals. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the 3rd Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the base stations are directly connected to the EPC core network rather than to RNCs. In general, in E-UTRAN/LTE the functions of a RNC are distributed between the base stations, e.g. eNodeBs in LTE, and the core network. As such, the Radio Access Network (RAN) of an EPS has an essentially "flat" architecture comprising base stations without reporting to RNCs.

Dual connectivity is a feature defined from the wireless terminal perspective wherein the wireless terminal may simultaneously receive from and transmit to at least two different network points, such as base stations. Dual connectivity is one of the features that are considered for standardization under the small cell enhancements study item within 3GPP Rel-12.

Dual connectivity is defined for the case when the aggregated network points operate on the same frequency or on separate or different frequencies. It is further foreseen that from the wireless terminal perspective, the wireless terminal may apply some form of Time Division Multiplexing (TDM) scheme between the different network points that the wireless terminal is aggregating in some scenarios. This implies that the communication on the physical layer to and from the different aggregated network points may not be truly simultaneous.

Dual connectivity as a feature bears many similarities with carrier aggregation and CoMP; the main differentiating factor is that dual connectivity is designed considering a relaxed backhaul and less stringent requirements on synchronization requirements between the network points. This is in contrast to carrier aggregation and CoMP wherein tight synchronization and a low-delay backhaul are assumed between connected network points. FIG. 1 shows a relationship between base stations of two different power levels in a wireless communication network.

TDD (Time Division Duplex) Systems

TDD systems have a feature that allows for asymmetric UL/DL allocations and thus, a possibility to adjust the used time-frequency resources in terms of instantaneous traffic. The UL/DL allocations may correspond to one of the seven different UL/DL configurations that are defined for LTE-TDD systems as shown in FIG. 2. This is contrary to Frequency Division Duplex (FDD) systems, where a bandwidth is either allocated to DL or UL operations regardless of the traffic pattern and the need at a certain node.

However, the cost of UL/DL dynamic resource adaptation is the cross interference between UL and DL that arises when neighboring cells use different TDD configurations, causing interference between base station to base stations or wireless terminal to wireless terminals, which does not occur in FDD systems. In some cases, these interferences can become very severe and impact the performance of the wireless communication network in a detrimental way.

SUMMARY

An object of embodiments herein is to provide a mechanism that improves the performance of a wireless communication network.

According to an aspect the object is achieved by providing a method, performed by a first base station, for handling scheduling of Time Division Duplex, TDD, uplink and/or downlink subframes for a wireless terminal. The wireless terminal is in dual connectivity with a first cell served by said first base station and a second cell served by a second base station. The first base station identifies a subframe in which an uplink/downlink scheduling conflict will occur between the first cell and the second cell due to a difference between a TDD configuration of the first cell and a TDD configuration of the second cell. The first base station determines a scheduling for the identified subframe based on at least one scheduling parameter; and sends, to the second base station, a scheduling instruction comprising the determined scheduling for the identified subframe.

According to another aspect the object is achieved by providing a method, performed by a second base station, for scheduling TDD uplink and/or downlink subframes for a wireless terminal. The wireless terminal is in dual connectivity with a first cell served by a first base station and a second cell served by the second base station. The second base station receives, from the first base station, a scheduling instruction for an identified subframe in which an uplink/downlink scheduling conflict will occur between the first cell and the second cell due to a difference between a TDD configuration of the first cell and a TDD configuration of the second cell, said scheduling instruction being based on at least one scheduling parameter. The second base station schedules the identified subframe according to the received scheduling instruction.

Furthermore, the object is achieved by providing a first base station, for handling scheduling of Time Division Duplex, TDD, uplink and/or downlink subframes for a wireless terminal. The wireless terminal is in dual connectivity with a first cell served by said first base station and a second cell served by a second base station. The first base station is configured to identify a subframe in which an uplink/downlink scheduling conflict will occur between the first cell and the second cell due to a difference between a TDD configuration of the first cell and a TDD configuration of the second cell. The first base station is configured to determine a scheduling for the identified subframe based on at least one scheduling parameter. The first base station is further configured to send, to the second base station, a scheduling instruction comprising the determined scheduling for the identified subframe.

Furthermore, the object is achieved by providing a second base station for scheduling TDD uplink and/or downlink subframes for a wireless terminal. The wireless terminal is in dual connectivity with a first cell served by a first base station and a second cell served by the second base station. The second base station is configured to receive from the first base station, a scheduling instruction for an identified subframe in which an uplink/downlink scheduling conflict will occur between the first cell and the second cell due to a difference between a TDD configuration of the first cell and a TDD configuration of the second cell, said scheduling instruction being based on at least one scheduling parameter. The second base station is further configured to schedule the identified subframe according to the received scheduling instruction.

Embodiments herein ensure that the wireless terminal transmits/receives with a reduced interference in a conflicting subframe providing an improved performance of the wireless communication network.

BRIEF DESCRIPTION OF THE DRAWINGS

Embodiments will now be described in more detail in relation to the enclosed drawings, in which.

DETAILED DESCRIPTION

Figure 3:
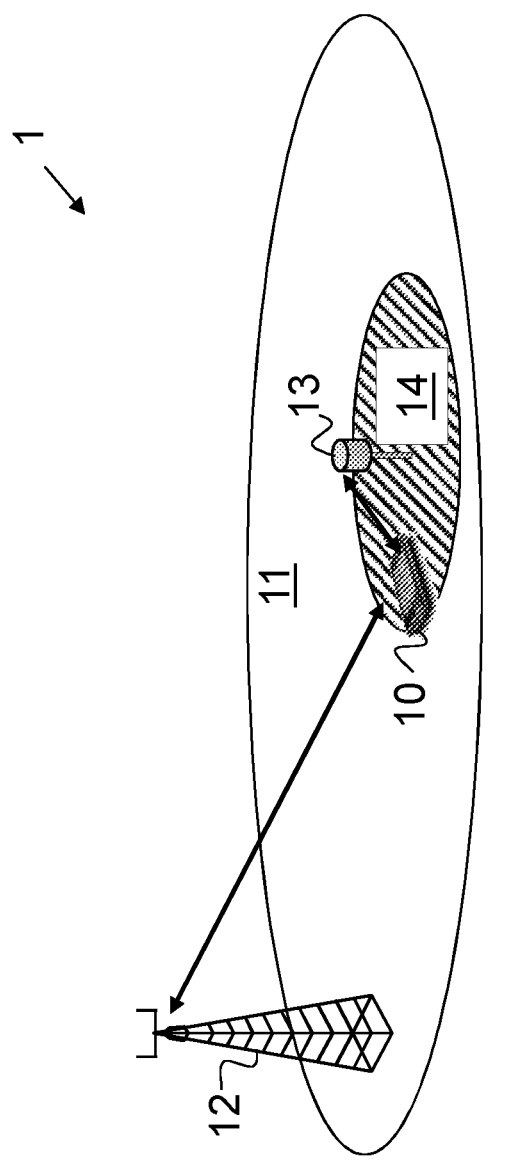
FIG. 3 shows a wireless communication network according to embodiments herein.

Embodiments herein relate to wireless communication networks in general. FIG. 3 is a schematic overview depicting a wireless communication network 1. The wireless communication network 1 comprises one or more Radio Access Networks (RAN) and one or more Core Networks (CN). The wireless communication network 1 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The wireless communication network 1 is exemplified herein as an LTE network.

In the wireless communication network 1, a wireless terminal 10, also known as a mobile station, a user equipment (UE) and/or a wireless device, communicates via a RAN to one or more CNs. It should be understood by the skilled in the art that "wireless terminal" is a non-limiting term which means any wireless terminal, user equipment, Machine Type Communication (MTC) device, a Device to Device (D2D) terminal, or node e.g. Personal Digital Assistant (PDA), laptop, mobile, sensor, relay, mobile tablets or even a small base station communicating within respective cell.

The wireless communication network 1 covers a geographical area which is divided into cell areas, e.g. a first cell 11 being served by a first base station 12. The first base station 12 may also be referred to as a first radio base station and e.g. a NodeB, an evolved Node B (eNB, eNode B), a base transceiver station, Access Point Base Station, base station router, or any other network unit capable of communicating with a user equipment within the cell served by the radio base station depending e.g. on the radio access technology and terminology used. The first base station 12 may serve one or more cells, such as the first cell 11. The first base station may be a macro base station.

Furthermore, the wireless communication network 1 comprises a second base station 13 providing radio coverage over a second area, a second cell 14. The second base station 13 may also be referred to as a second radio base station and e.g. a NodeB, an evolved Node B (eNB, eNode B), a base transceiver station, Access Point Base Station, base station router, or any other network unit capable of communicating with a user equipment within the cell served by the radio base station depending e.g. on the radio access technology and terminology used. The second base station 13 may serve one or more cells, such as the second cell 14. The second base station 13 may be a pico base station being of lower power than the first base station 12, being a macro base station, or vice versa. The first and second base stations may in other embodiments be of equal power, e.g. two macro base stations or two pico base stations.

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying each cell uniquely in the whole wireless communication network 1 is also broadcast in respective cell. Each base station communicates over the air or radio interface operating on radio frequencies with the wireless terminal 10 within range of the respective base station. The wireless terminal 10 transmits data over the radio interface to the respective base station in Uplink (UL) transmissions and the respective base station transmits data over an air or radio interface to the wireless terminal 10 in Downlink (DL) transmissions.

The wireless terminal 10 is in dual connectivity with the first cell 11 served by said first base station 12 and the second cell 14 served by the second base station 13. The wireless terminal 10 being in dual connectivity means e.g. that the wireless terminal 10 is configured to support dual connectivity either on a same carrier frequency applied for a first link with first base station 12 in the first cell 11 and a second link with second base station 13 in the second cell 14 where data, and/or control, transmitted on the first link is different from data (and/or control) transmitted on the second link, or on different carrier frequencies applied for the first and second links where data and/or control sent on the links is the same.

First a problem has been identified in developing embodiments herein. When a TDD UE, e.g. the wireless terminal 10, is connected to two or more different base stations, then there might be a possibility that the wireless terminal is asked by one base station to transmit in UL while another base station may ask it to receive in DL in the same subframe. In TDD, it is not possible for the wireless terminal 10 to transmit and receive at the same time. Embodiments herein solve this conflicting subframe issue, so that the wireless terminal 10 either only transmits or only receives in any subframe.

Figure 4:
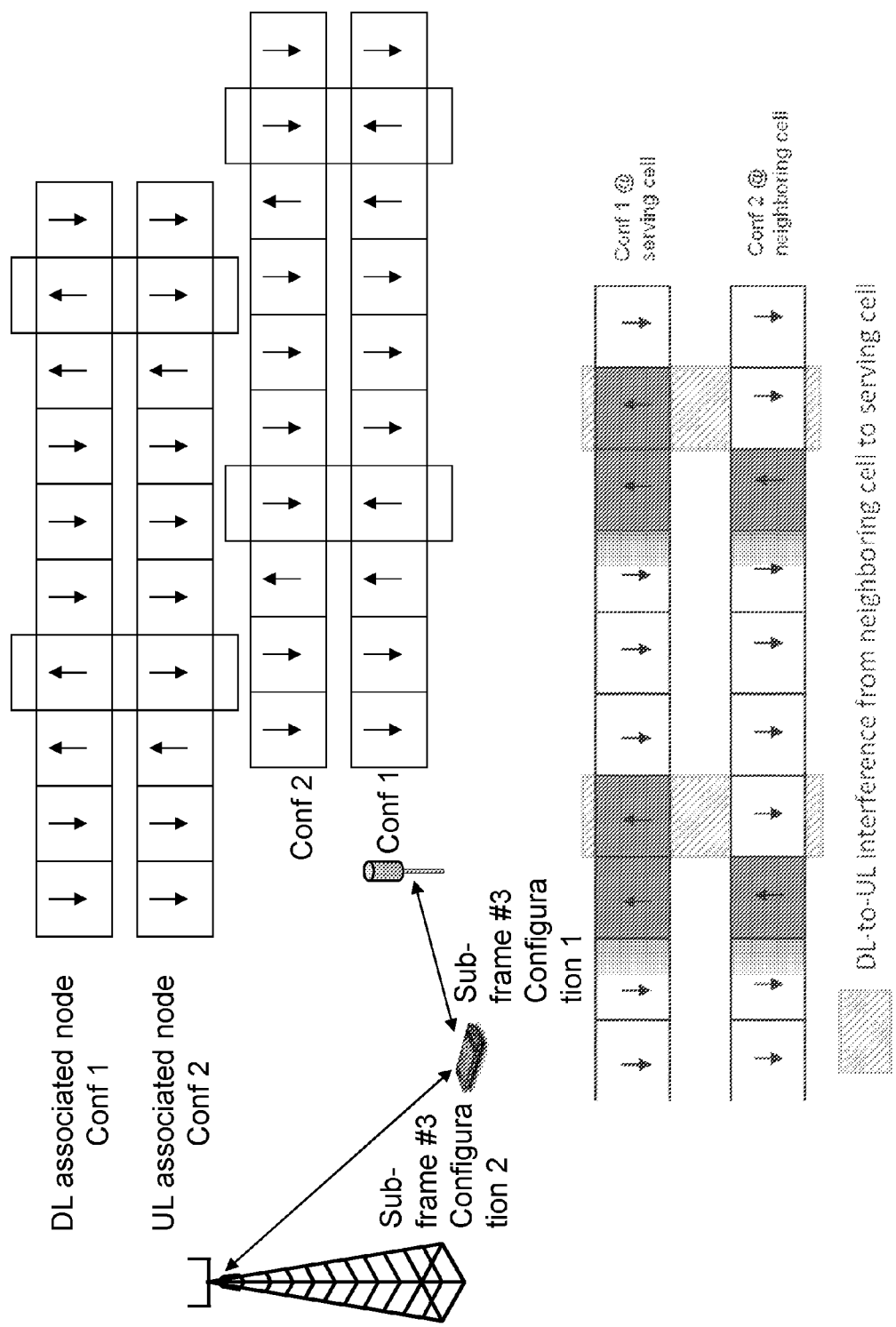
FIG. 4 shows different configurations at different base stations causing a problem with conflicting subframes.

A number of proposals have been made to better exploit different TDD configurations in different cells of the wireless communication network 1 to adapt to the instantaneous traffic situation, or to use fixed, or semi-static, TDD configurations in cells that are neighbors to each other. However, problems that arise when TDD is used in conjunction with dual connectivity are not captured by any previous solution. Some of the issues are listed below:

One problem that arises when TDD is used in conjunction with dual connectivity is the case when the wireless terminal 10, being dually connected to two base stations with different TDD configurations, may have to transmit to one node and simultaneously receive from the other node. This problem will specifically occur in sub-frames where the DL and UL operations are asymmetric among the cells, e.g. a sub-frame is used for UL transmissions in one cell while it is used for DL transmissions in a neighboring cell. The illustration of the problem is shown in FIG. 4, where a same wireless terminal is supposed to receive a transmission from e.g. a macro node applying TDD configuration 2 while at the same time, and using the same frequency resources, transmit to a low power node applying TDD configuration 1. Note that the notations macro node and low power node are used as example, thus these two nodes that the wireless terminal is connected to can be any kind of network nodes.

Currently in 3GPP LTE standard, dual connectivity is in study item phase, thus no solutions are available yet to mitigate this problem.

If a sub-frame is allocated for UL transmissions in a base station that is associated with DL transmissions to a wireless terminal, while the same sub-frame is allocated for DL transmissions by a base station that is associated with UL transmissions from the wireless terminal, then a solution is needed to optimize the use of such sub-frames. This situation may for example occur when the wireless terminal is connected to a low power base station for UL transmissions and to a macro base station for reception of DL transmissions. The wireless terminal will then still need to transmit UL control information, such as HARQ feedback, to the base station that is associated with the DL transmissions, and receive control information/feedback information regarding UL transmissions made to the base station that is associated with UL transmissions from that base station. This problem can be solved in two ways, one on a wireless terminal decision basis and the other one could be via network, or base station, decisions.

According to some of the example embodiments, methods for network based solutions to avoid the collision of UL and DL requests to a dually connected wireless terminal in the same subframe are provided. The methods comprise an alignment of subframes between the two base stations based on different criteria.

Since the network or the base stations has more information regarding the actual transmission status and network conditions, a network based UL/DL subframe alignment for a dually connected wireless terminal in conflicting subframes will solve the issue in an efficient way and is herein suggested. The main advantage is that the wireless terminal 10 will not receive any conflicting transmission or reception requests for the same subframe in a TDD based dual connectivity scenario. This is obtained at the expense of network coordination.

In the following description, two links are used for a dually connected wireless terminal, however all the methods described here can also be applied to wireless terminals connected to more than two base stations and via more than two links. Thus, the term dual connectivity or a dual connection may refer to a wireless terminal connected to any number of base stations, nodes, or cells via any number of links.

The example embodiments herein assist in avoiding the situation when the wireless terminal 10 is asked by two base stations to transmit and receive in the same subframe simultaneously. Thus, network communication is herein suggested between the first and second base station to ensure that such colliding subframes do not occur.

The method actions performed by the first base station 12 for handling scheduling of TDD uplink and/or downlink subframes for the wireless terminal 10 according to some embodiments will now be described with reference to a flowchart depicted in FIG. 5. The actions do not have to be taken in the order stated below, but may be taken in any suitable order. Actions performed in some embodiments are marked with dashed boxes. The wireless terminal 10 is in dual connectivity with the first cell 11 served by said first base station 12 and the second cell 14 served by the second base station 13.

Action 80.

The first base station 12 may maintain a list of cells serving the wireless terminal 10 and/or of base stations corresponding to the cells. It should be appreciated that according to some of the example embodiments, the first base station 12 may be an anchor base station. Therefore, in a system applying dual connectivity, all connection requests for assisting nodes, e.g. the second base station 13, attempting to serve the wireless terminal 10 are sent via the anchor base station, e.g., the first base station 12 as described in the example embodiments. Therefore, the first base station 12 will obtain knowledge of which cells and/or base stations are currently serving the wireless terminal 10. The TDD configurations of these base stations, e.g., the second base station 13 as described in the example embodiments, may be monitored in order to identify possible UL/DL scheduling conflicts.

Action 100.

The first base station 12 identifies a subframe in which an uplink/downlink scheduling conflict will occur between the first cell and the second cell due to a difference between a TDD configuration of the first cell 11 and a TDD configuration of the second cell 14.

Action 120.

The first base station 12 may identify the subframe by analyzing the TDD configuration of each cell, including said first and second cells, serving the wireless terminal 10. A frequency of the analyzing may be dependent on a reconfiguration rate of each respective cell serving the wireless terminal 10.

Action 140.

The first base station 12 determines a scheduling for the identified subframe based on at least one scheduling parameter. The scheduling may comprise to allocate a subframe for DL communication to the wireless terminal 10 or for UL communication from the wireless terminal 10 to the first base station 12. The at least one scheduling parameter may comprise a buffer state of the first base station 12 for serving the first cell 11 and/or a buffer state of the second base station 13 for serving the second cell 14. A buffer state is an indication of amount of data for transmissions to the wireless terminal 10. The buffer state may in some embodiments be an indication of an amount of data for transmissions from the wireless terminal 10.

Action 160.

Then the first base station 12 may determine the scheduling so that the identified subframe is scheduled according to the TDD configuration of the one of the first and second cells, for which the respective buffer state indicates a larger buffer level or amount of data to be processed or sent as compared to the respective buffer state for serving the other one of the first and second cells. In one such embodiment, the first base station 12 determines the scheduling by scheduling the identified subframe according to the TDD configuration of the one of the first and second cells, for which the respective buffer state indicates a larger buffer level or amount of data to be processed or sent as compared to the respective buffer state for serving the other one of the first and second cells.

Action 180.

In some embodiments wherein the at least one scheduling parameter comprises an uplink resource request of or made to the first base station 12 serving the first cell 11 and/or an uplink resource request of or made to the second base station 13 serving the second cell 14, the first base station 12 determines the scheduling so that the identified subframe is scheduled according to the TDD configuration of the one of the first and second cells, for which the respective uplink resource request is a larger one of the uplink resource requests or if such request surpasses a threshold. In one such embodiment, the first base station 12 determines the scheduling by scheduling the identified subframe according to the TDD configuration of the one of the first and second cells, for which the respective uplink resource request is a larger one of the uplink resource requests or if such request surpasses a threshold. The uplink resource requests may have been made by the wireless terminal 10. In one example, when the wireless terminal 10 has more data to communicate to the first base station 12 than to the second base station 13, the TDD configuration of the first base station 12 is used. In another example, assuming that the identified subframe where a conflict may occur is a DL subframe according to the TDD configuration of the first cell 11 and a UL subframe according to the TDD configuration of the second cell 14, and the buffer state of the first base station 12 for serving the first cell 11 is the larger one compared to the buffer state of the second base station 13 for serving the second cell 14, but the uplink resource request from the wireless terminal 10 to the second base station 13 serving the second cell 14 surpasses a threshold. In this situation, based on a combination of scheduling parameters, the first base station 12 may determine the scheduling of the identified subframe so that it is scheduled according to the TDD configuration of the second cells 14 in order to allow the uplink transmission from the wireless terminal 10.

Action 200.

In some embodiments the at least one scheduling parameter comprises an upcoming uplink allocation made according to any one of the TDD configurations of the first and second cells in the identified subframe, and the first base station 12 determines the scheduling so that the identified subframe is scheduled to receive or carry only uplink communications. In one such embodiment, the first base station 12 determines the scheduling by scheduling the identified subframe to receive or carry only uplink communications. Therefore, downlink communications to the wireless terminal 10 are restricted or prevented in the identified subframe.

Action 220.

In some embodiments the at least one scheduling parameter comprises an identity of a preferred base station, and the first base station 12 determines the scheduling by determining, from the first and second base stations, the identity of the preferred base station. The identity of the preferred base station may for example be determined from the identities of the first and second base stations. The identity of the preferred base station may further be statically determined. Alternatively, the identity of the preferred base station may be dynamically determined, and the first base station 12 may determine the identity of the preferred base station based on any one or more of: a location of the wireless terminal 10, base station traffic loads, and/or a type of transmitted data. According to this example embodiment, the preferred base station may be chosen as the base station to which the wireless terminal is most closely located. Furthermore, the determination of the preferred base station may be determined based on which one of the base stations has the highest traffic load. In addition, or alternatively, the preferred base station may be determined based on a type of data being transmitted, e.g., a base station may be configured to transmit only real time or non-real time data.

Action 240.

Upon having determined the scheduling as of action 220, the first base station 12 may schedule the identified subframe according to the TDD configuration of a respective one of the first and second cells served by the preferred base station. According to some of the example embodiments, the preferred base station may be the anchor base station, assisting base station or any other predetermined node.

Action 260.

In some embodiment the at least one scheduling parameter comprises a predetermined preference scheduling, wherein one of the first base station 12 and the second base station 13 is a preferred base station based on the predetermined preference scheduling, and the first base station 12 may determine scheduling by determining the preferred base station according to the predetermined preference scheduling. The predetermined preference scheduling may be based on a round robin or proportional fair scheduling mechanism.

Action 280.

Upon having determined the scheduling as of action 260, the first base station 12 may schedule the identified subframe according to the TDD configuration of a respective one of the first and second cells served by the preferred base station.

Action 300.

The first base station 12 sends, to the second base station 13, a scheduling instruction comprising the determined scheduling for the identified subframe. It should be appreciated that the term "scheduling instructions" shall be interpreted broadly. Scheduling instructions may e.g. comprise any kind of information that may be shared to assist the second base station 13 to determine its UL/DL direction of the identified subframe. For example, the "scheduling instructions" may be that the first base station 12 may inform the second base station 13 about an UL subframe scheduled and the second base station 13 then avoids scheduling any DL transmissions on that subframe.

UL/DL Subframe Alignment Based on Traffic

According to embodiments herein the first base station 12 and the second base station 13 communicate with each other via a backhaul link and decide on the subframe direction based on the UL and DL traffic and resource allocation requests.

As an example, if a buffer state in a DL node, e.g. the first base station 12, is higher compared to a buffer state in UL node, e.g. the base station 13, then the wireless terminal 10 can be required to receive in the DL in the mentioned subframe. In that case, the other, i.e. the second base station 13, will not grant any UL allocation for this wireless terminal 10 in that subframe. This corresponds to actions 140-160 in FIG. 5.

As another example, if an uplink resource request is large or surpasses a threshold; the wireless terminal 10 may be required to transmit in the UL in the mentioned subframe. In this case, the other node, i.e. the first base station 12, will not grant any DL allocation for the wireless terminal 10 in this subframe. This corresponds to action 180 in FIG. 5.

UL/DL Subframe Alignment Based on UL Allocations

Since UL allocations are done at least 4 ms prior to actual UL transmission, a base station may decide not to allocate DL grants, i.e. DL assignments to a subframe to keep the colliding subframe as UL for the wireless terminal 10, when an UL allocation by the other base station is already done.

An example of this will now be described with reference to FIG. 6, where DL allocated subframes are marked as white subframes, UL allocated subframes are marked as diagonally striped subframes, and special subframes are horizontally striped subframes. Uplink Control Information (UCI) in Physical Downlink Control Channel (PDCCH) from Node #1, first base station 12, to the wireless terminal 10, and Node #2, second base station 13, is informed via backhaul. As described in FIG. 6, if eNB #1, the first base station 12, allocates an UL grant to the wireless terminal 10 4 ms prior to the actual UL transmission, then eNB #2, the second base station 13, may not allocate any resources for DL in that subframe for that wireless terminal 10. Thus, only UL transmission will happen towards the first base station 12 in the colliding subframe. This corresponds to action 200 in FIG. 5.

UL/DL Subframe Alignment Based on the Decision of the Anchor Node, or by Certain Preferred Node According to some of the example embodiments, one base station may always follow the decision made by the other base station. The two base stations may be anchor and assisting nodes, or they can belong to different layers like a macro and a pico node, or simply act based on some mutual agreements in the network.

Figure 1:
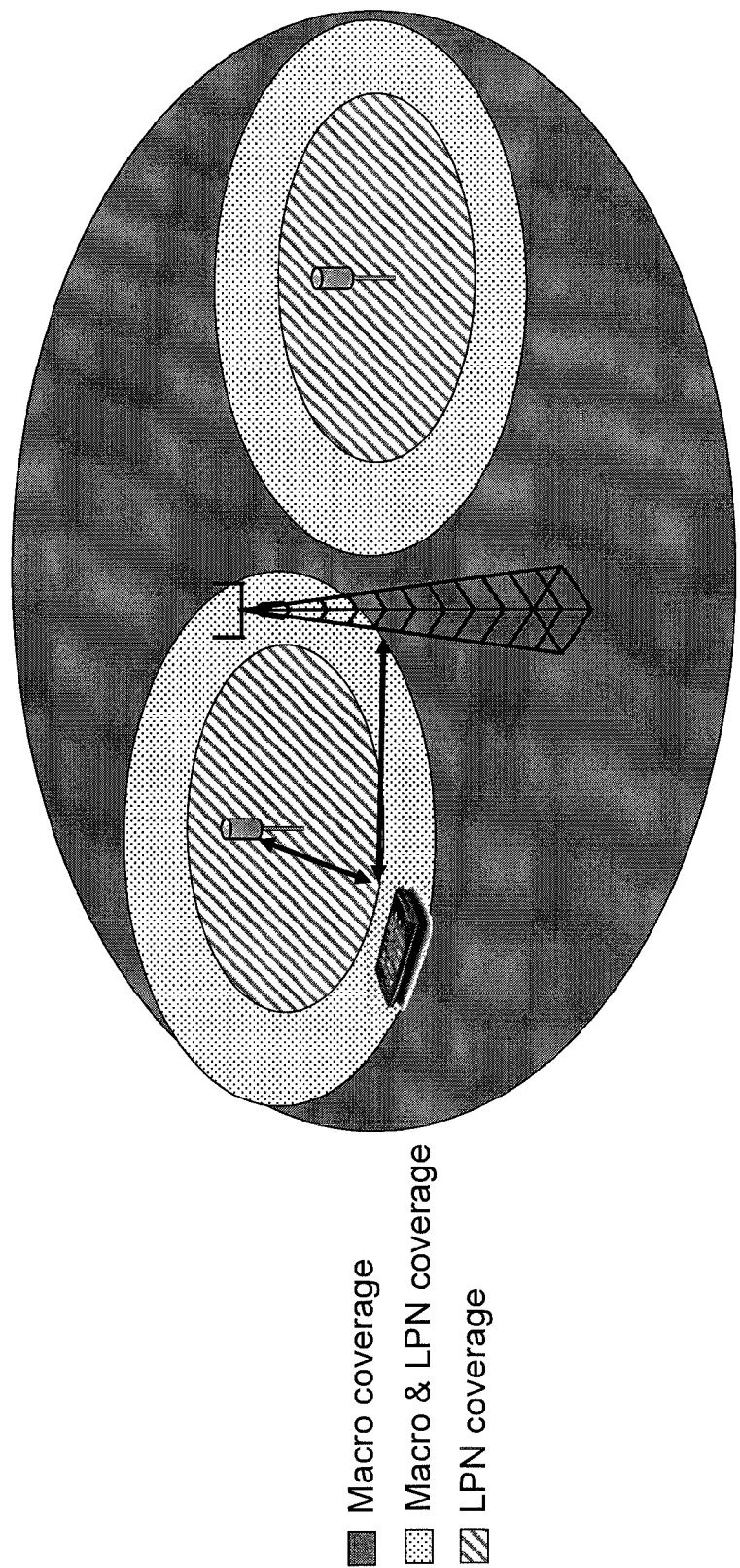
FIG. 1 shows an architecture of a wireless communication network.
Figure 2:
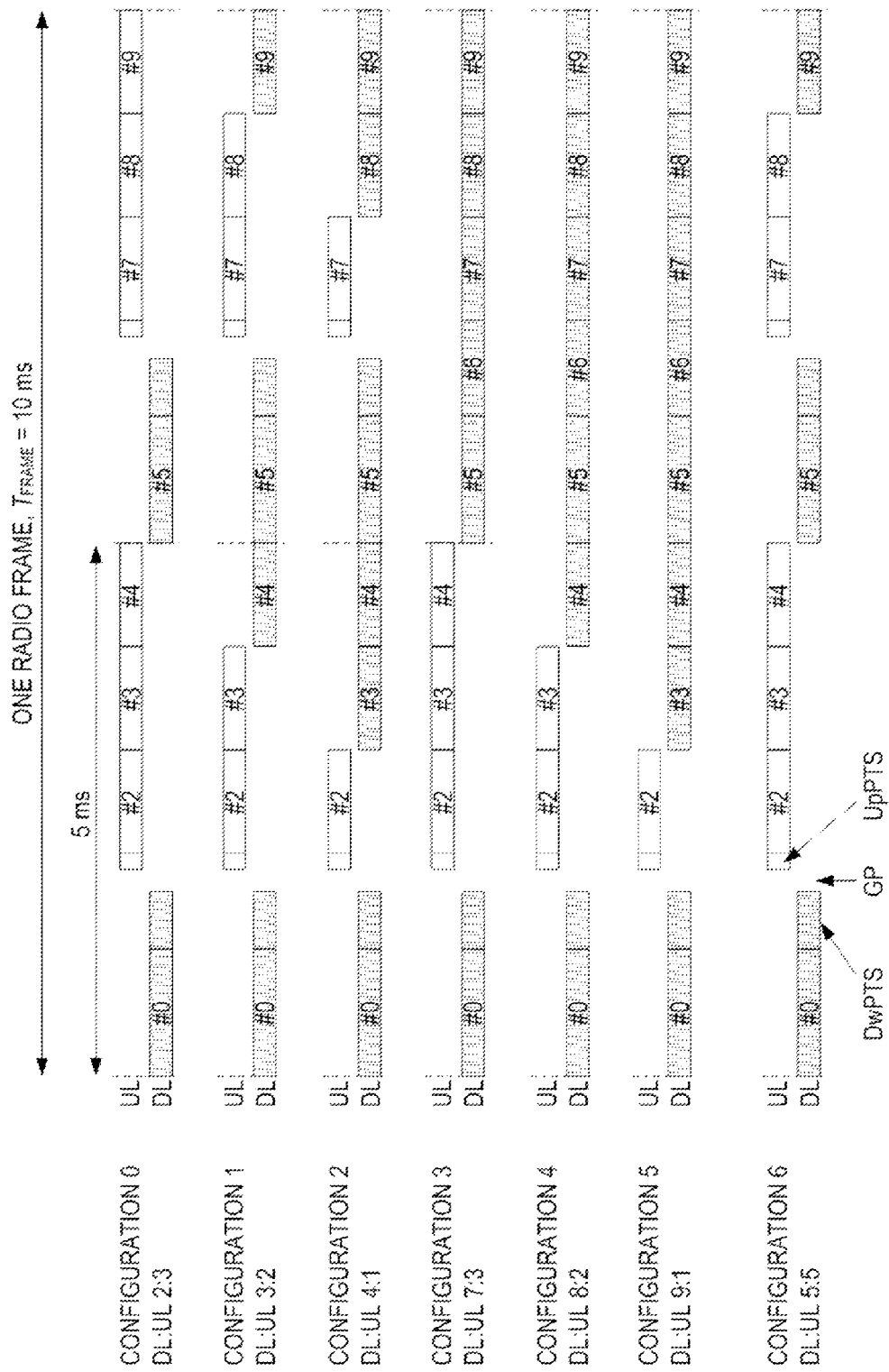
FIG. 2 shows different configurations of different base stations/cells.
Figure 7:
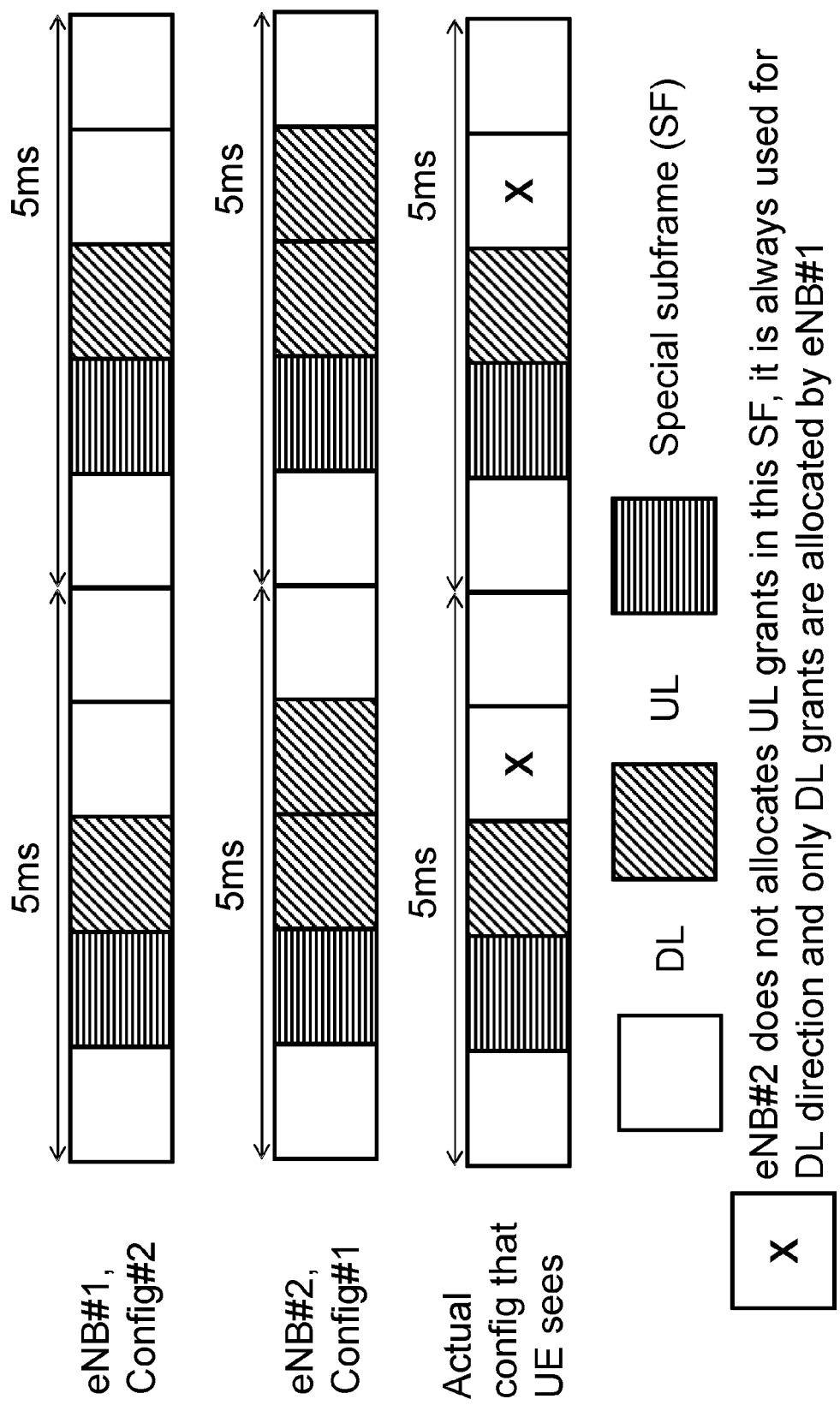
FIG. 7 shows a scheduling according to embodiments herein.

As an example, if the eNB #2, second base station 13, or an assisting node or not-preferred node, uses TDD configuration 1 and the eNB #1, first base station 12, or anchor node or a preferred node, uses TDD configuration 2, then there may be conflicting request in $3^{rd}$ and $8^{th}$ subframe as seen in FIG. 2 and FIG. 4. In this case, see FIG. 7, the first base station 12 always allocates DL grants, i.e. DL assignments, for the wireless terminal 10 in this subframe, i.e. the subframe where there may be a conflicting request, and the second base station 13 does not allocate any UL grants for this subframe for that wireless terminal 10. These subframes are marked with an X in the figure. DL allocated subframes are marked as white subframes, UL allocated subframes are marked as diagonally striped subframes, and special subframes are horizontally striped subframes.

According to some of the example embodiments, the non-preferred node, second base station 13, can only use the subframe in either UL or DL for the wireless terminal 10 only if the preferred node, first base station 12, does not allocate any assignments or grants for the wireless terminal 10 in this subframe.

According to some of the example embodiments, the role of preferred and non-preferred node can be exchanged between the nodes in certain time frames. According to some of the example embodiments, the allocation of a preferred node, or base station, may be static. For example, the anchor node, or first base station 12, may be designated to be the preferred node. According to some of the example embodiments, the allocation of a preferred node may be dynamic. Thus, an identity of the preferred node may change at any time. According to some of the example embodiments, the preferred node may be chosen based on a proximity to the wireless terminal 10. Therefore, a base station which is closer to the wireless terminal's current location may be chosen as the preferred node.

According to some of the example embodiments, the dynamic allocation of a preferred node may also be provided based on a type of traffic the base stations are configured to provide, e.g., real time vs non-real time traffic. According to some of the example embodiments, the preferred node may also be chosen based on a traffic load of any of the base stations.

Figure 5:
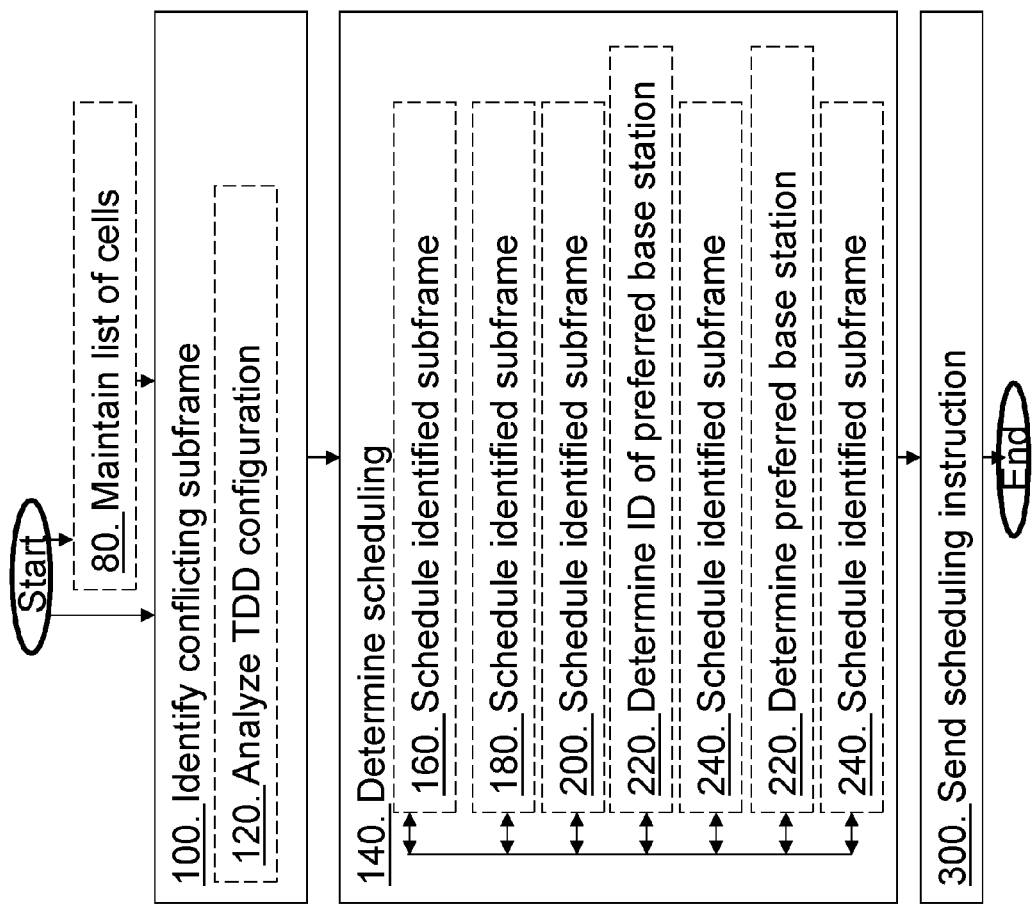
FIG. 5 shows a method performed by a first base station according to embodiments herein.
Figure 6:
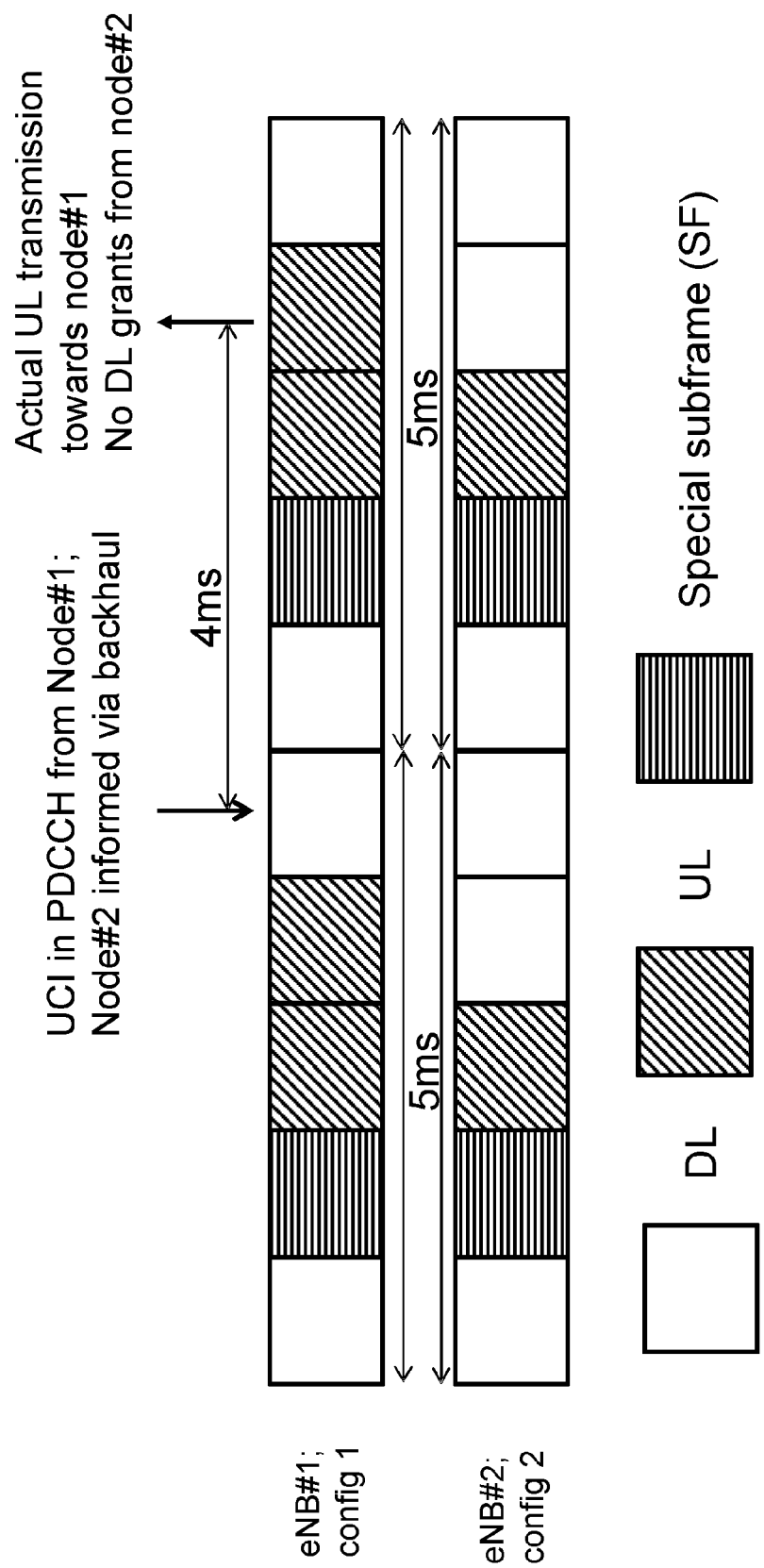
FIG. 6 shows a scheduling according to embodiments herein.

This corresponds to actions 220-240 in FIG. 5.

UL/DL Alignment Based on Fairness

According to some of the example embodiments, the network nodes may fairly distribute the conflicting subframes between UL and DL for the UE, or wireless terminal.

Figure 8:
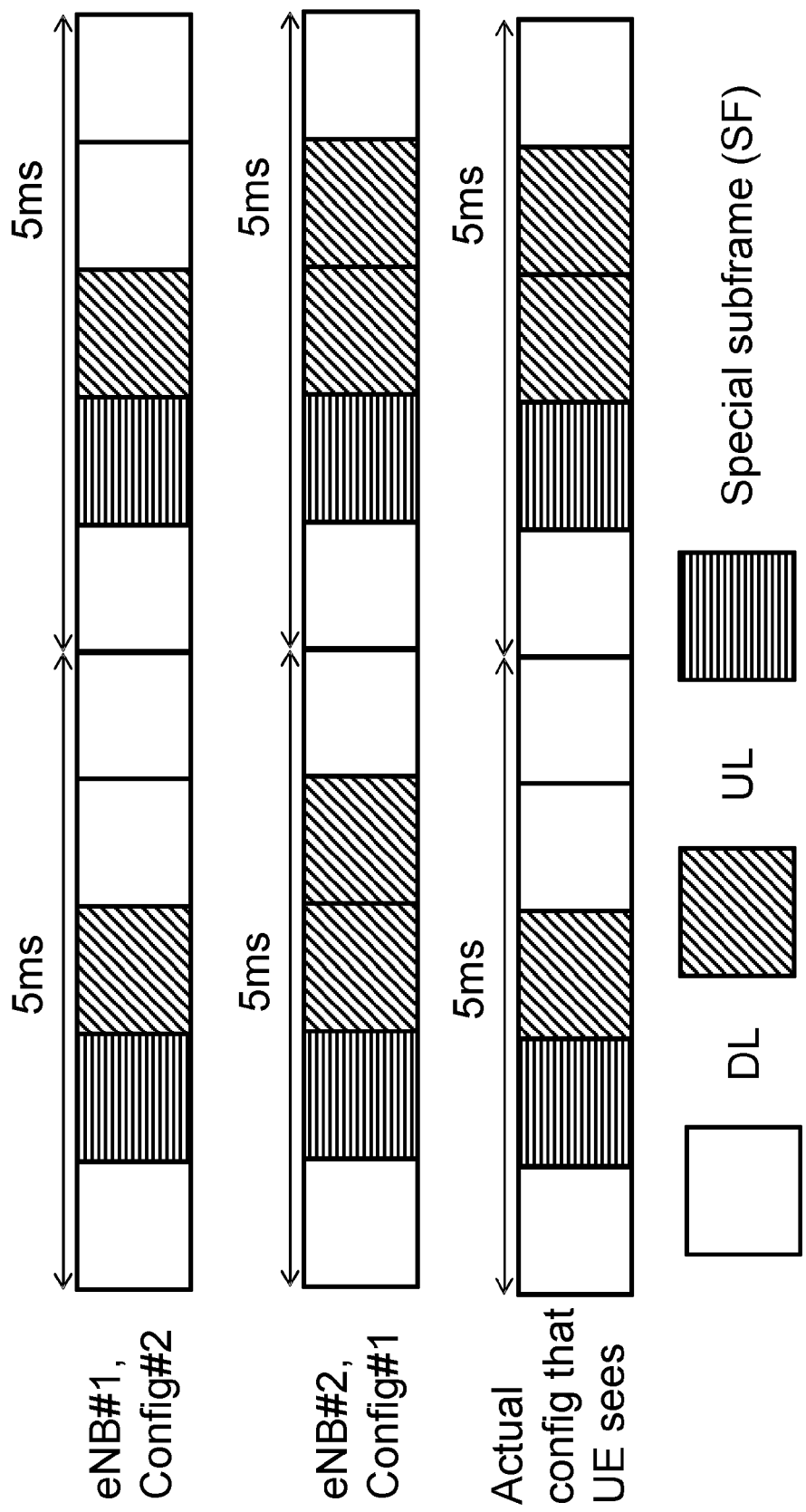
FIG. 8 shows a scheduling according to embodiments herein.

As an example as seen in FIG. 8, the conflicting subframes are $3^{rd}$ and $8^{th}$ subframes. In this example, the $3^{rd}$ subframe is allocated as DL thus the wireless terminal 10 receives from anchor node, while the $8^{th}$ subframe is allocated as UL, thus the wireless terminal 10 transmits to the assisting node in $8^{th}$ subframe. DL allocated subframes are marked as white subframes, UL allocated subframes are marked as diagonally striped subframes, and special subframes are horizontally striped subframes in FIG. 8. In this example, the nodes are termed anchor and assisting nodes, however the method can be applied between any two nodes to which the wireless terminal 10 is connected. It should further be appreciated that the term assisting and booster may be used interchangeably.

According to some of the example embodiments, a group of colliding subframes may be linked to the first base station 12, while the next group of colliding subframes may be linked to the second base station 13.

According to some of the example embodiments, well known fairness algorithms, such as round robin, proportional fair scheduling algorithms, etc can be used to allocate this subframe between two different nodes. A proportional fair scheduling algorithm may refer to any scheduling method where different weights are assigned to different links. The weights are usually inversely proportional to the average consumed resources.

This corresponds to action 260-280 in FIG. 5.

It should be understood that any combination of exemplified embodiments herein is also possible. Thus, a decision for UL or DL scheduling may be based on any combination of exemplified scheduling parameters. For example, the decision may be based on a combination of a buffer state of the first base station 12 and an uplink resource request of the second base station 13, as explained above in relation to Action 180.

Figure 9:
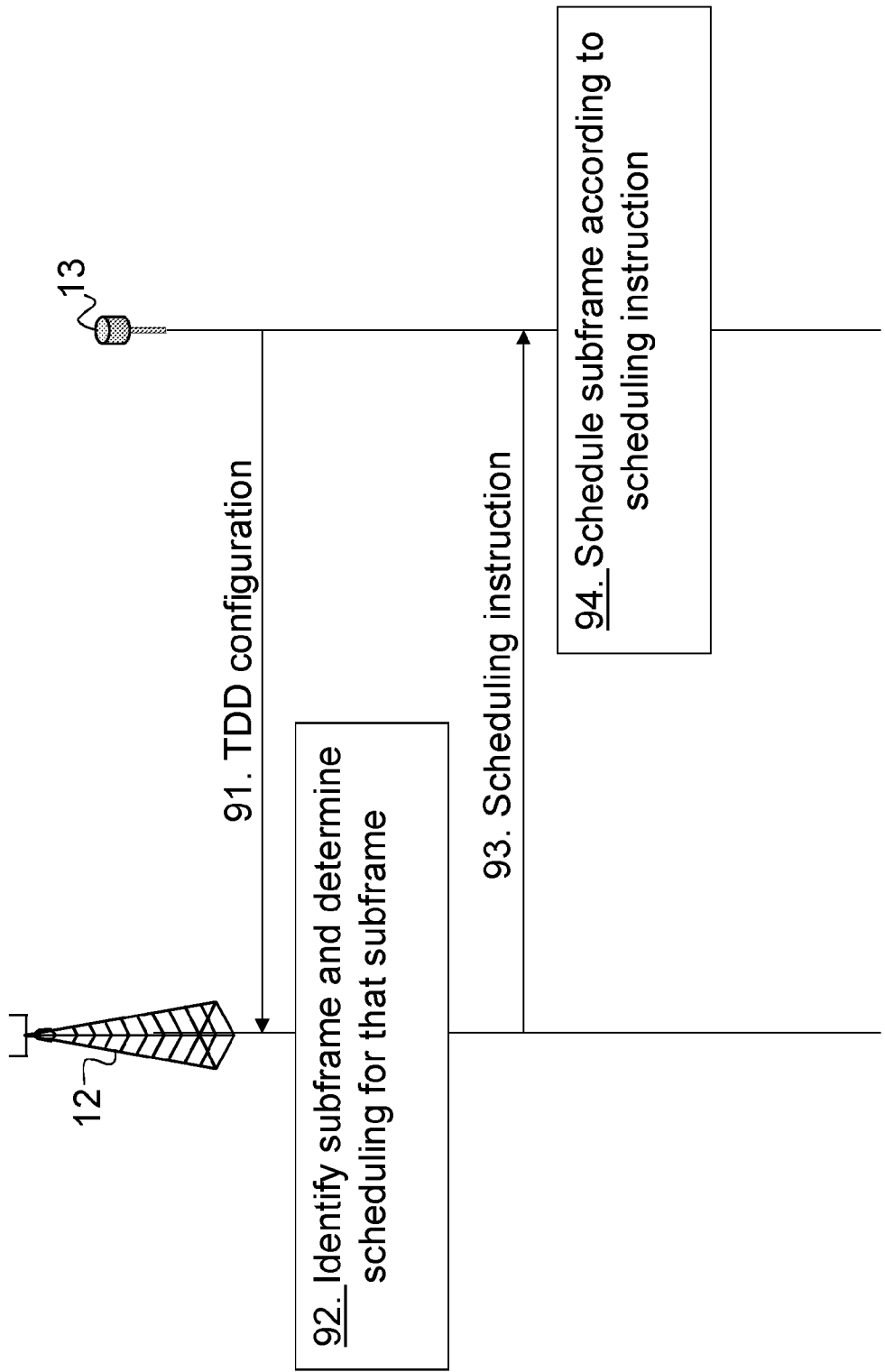
FIG. 9 shows a combined flowchart and signaling scheme according to embodiments herein.

FIG. 9 is a combined flowchart and signaling scheme according to embodiments herein.

Action 91.

The second base station 13 may e.g. send the TDD configuration of the second cell 14 to the first base station 12. The first base station 12 may obtain the TDD configuration of the second cell 14 in a different manner e.g. from another network node, manual input, during configuration in the wireless communication network or similarly.

Action 92.

The first base station 12 then identifies a subframe in which an uplink/downlink scheduling conflict will occur between the first cell 11 and the second cell 14 due to a difference between the TDD configuration of the first cell and the TDD configuration of the second cell. Additionally, the first base station 12 determines a scheduling, i.e. if the subframe is for an UL transmission or a DL transmission, for the identified subframe based on at least one scheduling parameter, see above examples of scheduling parameters. This corresponds to the actions 100 and 140 in FIG. 5 above.

Action 93.

The first base station 12 sends, to the second base station 13, the scheduling instruction comprising the determined scheduling for the identified subframe. This corresponds to action 300 in FIG. 5.

Action 94.

The second base station 13 receives the scheduling instruction and schedules the identified subframe according to the received scheduling instruction. This corresponds to actions 400 and 410 described below with reference to FIG. 10.

Figure 10:
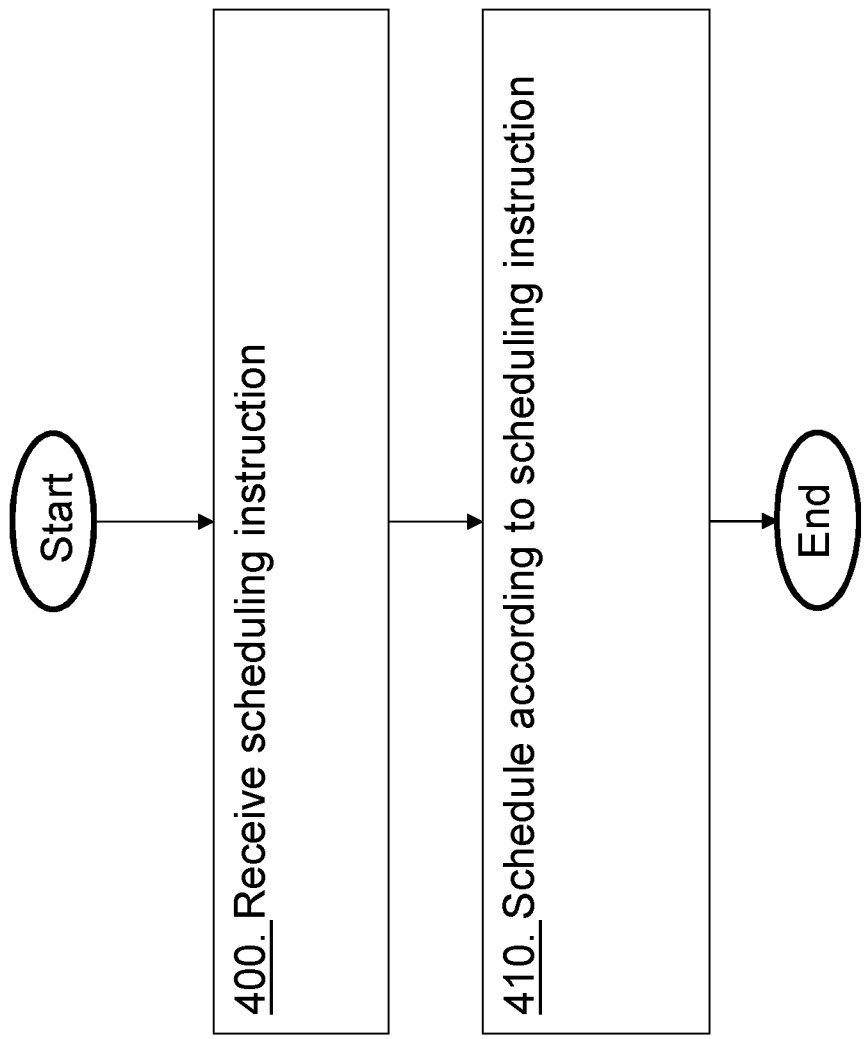
FIG. 10 shows a method performed by a second base station according to embodiments herein.

The method actions performed by the second base station 13 for scheduling TDD uplink and/or downlink subframes for a wireless terminal 10, according to some embodiments will now be described with reference to a flowchart depicted in FIG. 10. The actions do not have to be taken in the order stated below, but may be taken in any suitable order. The wireless terminal 10 is in dual connectivity with the first cell 11 served by the first base station 12 and the second cell 14 served by the second base station 13.

Action 400.

The second base station 13 receives, from the first base station 12, a scheduling instruction for an identified subframe in which an uplink/downlink scheduling conflict will occur between the first cell 11 and the second cell 14 due to a difference between a TDD configuration of the first cell and a TDD configuration of the second cell, said scheduling instruction being based on at least one scheduling parameter.

Action 410.

The second base station 13 schedules the identified subframe according to the received scheduling instruction.

The at least one scheduling parameter may comprise a buffer state of the first base station 12 for serving the first cell 11 and/or a buffer state of the second base station 13 for serving the second cell 14. The scheduling instruction may indicate scheduling of the identified subframe according to the TDD configuration of the one of the first and second cells, for which the respective buffer state indicates a larger buffer level or amount of data to be processed or sent as compared to the respective buffer state for serving the other one of the first and second cells. The buffer state may in some embodiments be an indication of an amount of data for transmissions from the wireless terminal 10.

In some embodiments the at least one scheduling parameter comprises an uplink resource request of or made to the first base station 12 serving the first cell 11 and/or an uplink resource request of or made to the second base station 13 serving the second cell 14. The scheduling instruction may then indicate scheduling of the identified subframe according to the TDD configuration of the one of the first and second cells, for which the respective uplink resource request is a larger one of the uplink resource requests or if such request surpasses a threshold. The uplink resource requests may have been made by the wireless terminal 10.

In some embodiments the at least one scheduling parameter comprises an upcoming uplink allocation made according to any one of the TDD configurations of the first and second cells in the identified subframe, wherein the scheduling instruction indicates scheduling of or for the identified subframe to receive or carry only uplink communications. Therefore, downlink communications to the wireless terminal 10 are restricted or prevented in the identified subframe.

In some embodiments the at least one scheduling parameter comprises an identity of a preferred base station, said identity of the preferred base station being determined from the first and second base stations; and the scheduling instruction indicates scheduling of or for the identified subframe according to the TDD configuration of a respective one of the first and second cells served by the preferred base station. The identity of the preferred base station may for example be determined from the identities of the first and second base stations. The identity of the preferred base station may further be statically determined. Alternatively, the identity of the preferred base station may be dynamically determined, and the determination of the identity of the preferred base station may be based on any one or more of: a location of the wireless terminal (10), base station traffic loads, and/or a type of transmitted data. According to this example embodiment, the preferred base station may be chosen as the base station to which the wireless terminal 10 is most closely located. Furthermore, the determination of the preferred base station may be determined based on which one of the base stations has the highest traffic load. In addition, or alternatively, the preferred base station may be determined based on a type of data being transmitted, e.g., a base station may be configured to transmit only real time or non-real time data. According to some of the example embodiments, the preferred base station may be the anchor base station, the assisting base station or any other predetermined node.

In some embodiments the at least one scheduling parameter comprises a predetermined preference scheduling, wherein one of the first base station 12 and the second base station 13 is a preferred base station based on the predetermined preference scheduling. Then the scheduling instruction may provide or prescribe scheduling of or for the identified subframe according to the TDD configuration of a respective one of the first and second cells served by the preferred base station.

The predetermined preference scheduling may be based on a round robin or proportional fair scheduling mechanism.

It should be appreciated that in applying the example embodiments described in the above sections, first a subframe in UL/DL conflict may be identified. The anchor node, or any other node or base station designated as a master node, may be configured to monitor for such conflicts. The frequency of the monitoring may depend on a rate of reconfiguration, e.g., how quickly TDD configurations are updated or changed, of the anchor and assisting nodes.

It should also be appreciated that the anchor node may maintain a listing or a list featuring all cells and corresponding assisting base stations which are simultaneously serving the wireless terminal 10. This list may be utilized such that the anchor node will know which base stations to monitor in identifying subframes with UL/DL conflicts. It should be appreciated that all requests for newly established connections between the wireless terminal 10 and assisting nodes or base stations may be provided via the anchor node. Therefore, the anchor node will have knowledge of which assisting nodes are serving particular wireless terminals.

Figure 11:
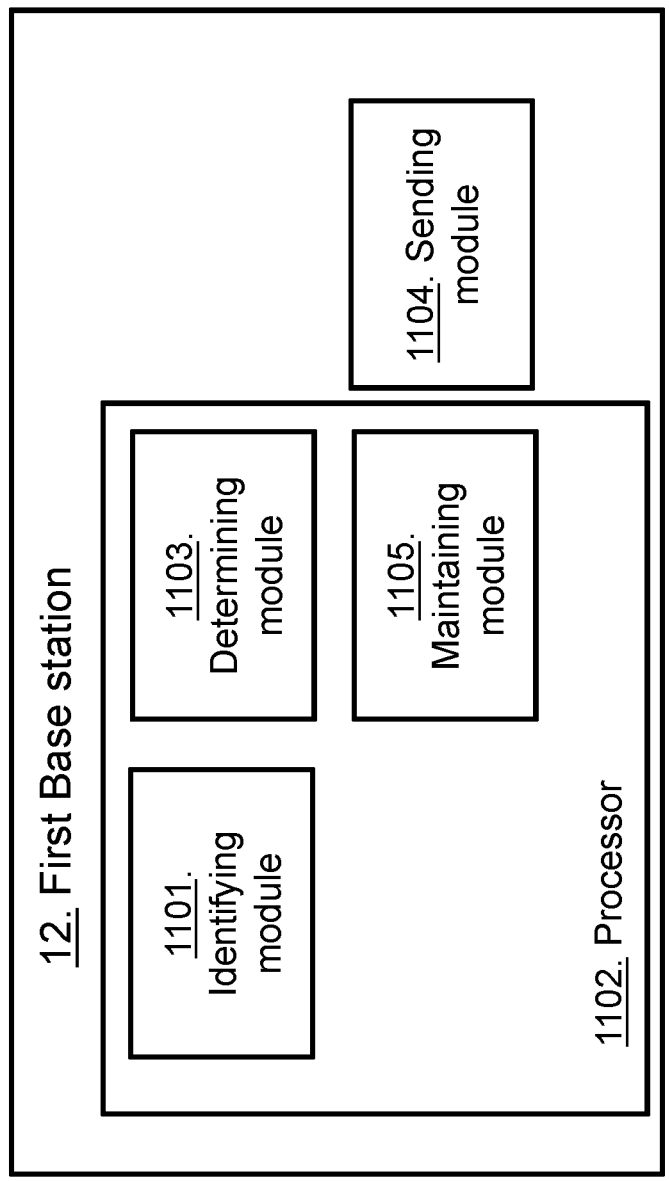
FIG. 11 shows a block diagram depicting a first base station according to embodiments herein.

FIG. 11 is a block diagram depicting the first base station 12, for handling scheduling of TDD uplink and/or downlink subframes for the wireless terminal 10. The wireless terminal 10 is in dual connectivity with the first cell 11 served by said first base station 12 and the second cell 14 served by the second base station 13.

The first base station 12 may comprise an identifying module 1101 and/or a processor 1102. The first base station 12, the identifying module 1101, and/or the processor 1102 may be configured to identify a subframe in which an uplink/downlink scheduling conflict will occur between the first cell and the second cell due to a difference between a TDD configuration of the first cell 11 and a TDD configuration of the second cell 14.

The first base station 12, the identifying module 1101, and/or the processor 1102 may be configured to identify the subframe by further being configured to analyze the TDD configuration of each cell, including said first and second cells, serving the wireless terminal 10. The first base station 12, the identifying module 1101, and/or the processor 1102 may further be configured to analyze the TDD configuration in a frequency that is dependent on a reconfiguration rate of each respective cell serving the wireless terminal 10.

The first base station 12 may comprise a determining module 1103. The first base station 12, the determining module 1103, and/or the processor 1102 may be configured to determine a scheduling for the identified subframe based on at least one scheduling parameter.

The first base station 12 may comprise a sending module 1104. The first base station 12, the sending module 1104, and/or the processor 1102 may be configured to send, to the second base station 13, a scheduling instruction comprising the determined scheduling for the identified subframe.

The first base station 12 may comprise a maintaining module 1105. The first base station 12, the maintaining module 1105, and/or the processor 1102 may be configured to maintain a list of cells serving the wireless terminal (10) and/or of base stations corresponding to the cells.

In some embodiments the at least one scheduling parameter comprises a buffer state of the first base station 12 for serving the first cell 11 and/or a buffer state of the second base station 13 for serving the second cell 14. Then the first base station 12, the determining module 1103, and/or the processor 1102 may be configured to determine the scheduling such that the identified subframe is scheduled according to the TDD configuration of the one of the first and second cells, for which the respective buffer state indicates a larger buffer level or amount of data to be processed or sent as compared to the respective buffer state for serving the other one of the first and second cells. In one such embodiment, the first base station 12, the determining module 1103, and/or the processor 1102 is configured to determine the scheduling by further being configured to schedule the identified subframe according to the TDD configuration of the one of the first and second cells, for which the respective buffer state indicates a larger buffer level or amount of data to be processed or sent as compared to the respective buffer state for serving the other one of the first and second cells. The buffer state may in some embodiments be an indication of an amount of data for transmissions from the wireless terminal 10.

In some embodiments the at least one scheduling parameter comprises an uplink resource request of or made to the first base station 12 serving the first cell 11 and/or an uplink resource request of or made to the second base station 13 serving the second cell 14. Then the first base station 12, the determining module 1103, and/or the processor 1102 may be configured to determine the scheduling such that the identified subframe is scheduled according to the TDD configuration of the one of the first and second cells, for which the respective uplink resource request is a larger one of the uplink resource requests or if such request surpasses a threshold. In one such embodiment, the first base station 12, the determining module 1103, and/or the processor 1102 is configured to determine the scheduling by further being configured to schedule the identified subframe according to the TDD configuration of the one of the first and second cells, for which the respective uplink resource request is a larger one of the uplink resource requests or if such request surpasses a threshold. The uplink resource requests may have been made by the wireless terminal 10.

In some embodiments the at least one scheduling parameter comprises an upcoming uplink allocation made according to any one of the TDD configurations of the first and second cells in the identified subframe. Then the first base station 12, the determining module 1103, and/or the processor 1102 may be configured to determine the scheduling such that the identified subframe is scheduled to receive or carry only uplink communications. In one such embodiment, the first base station 12, the determining module 1103, and/or the processor 1102 is configured to determine the scheduling by further being configured to schedule the identified subframe to receive or carry only uplink communications. Therefore, downlink communications to the wireless terminal 10 are restricted or prevented in the identified subframe.

In some embodiments the at least one scheduling parameter comprises an identity of a preferred base station, and the first base station 12, the determining module 1103, and/or the processor 1102 may be configured to determine the scheduling by further being configured to determine, from the first and second base stations, the identity of the preferred base station; and to schedule the identified subframe according to the TDD configuration of a respective one of the first and second cells served by the preferred base station. The identity of the preferred base station may for example be determined from the identities of the first and second base stations.

The first base station 12, the determining module 1103, and/or the processor 1102 may be configured to determine the identity of the preferred base station statically.

The first base station 12, the determining module 1103, and/or the processor 1102 may alternatively be configured to determine the identity of the preferred base station dynamically and based on any one or more of: a location of the wireless terminal 10, base station traffic loads, and/or a type of transmitted data.

In some embodiments the at least one scheduling parameter comprises a predetermined preference scheduling, wherein one of the first base station 12 and the second base station 13 is a preferred base station based on the predetermined preference scheduling. Then the first base station 12, the determining module 1103, and/or the processor 1102 may be configured to determine the scheduling by being configured to determine the identity of the preferred base station according to the predetermined preference scheduling; and to schedule the identified subframe according to the TDD configuration of a respective one of the first and second cells served by the preferred base station. The predetermined preference scheduling may be based on a round robin or proportional fair scheduling mechanism.

Figure 12:
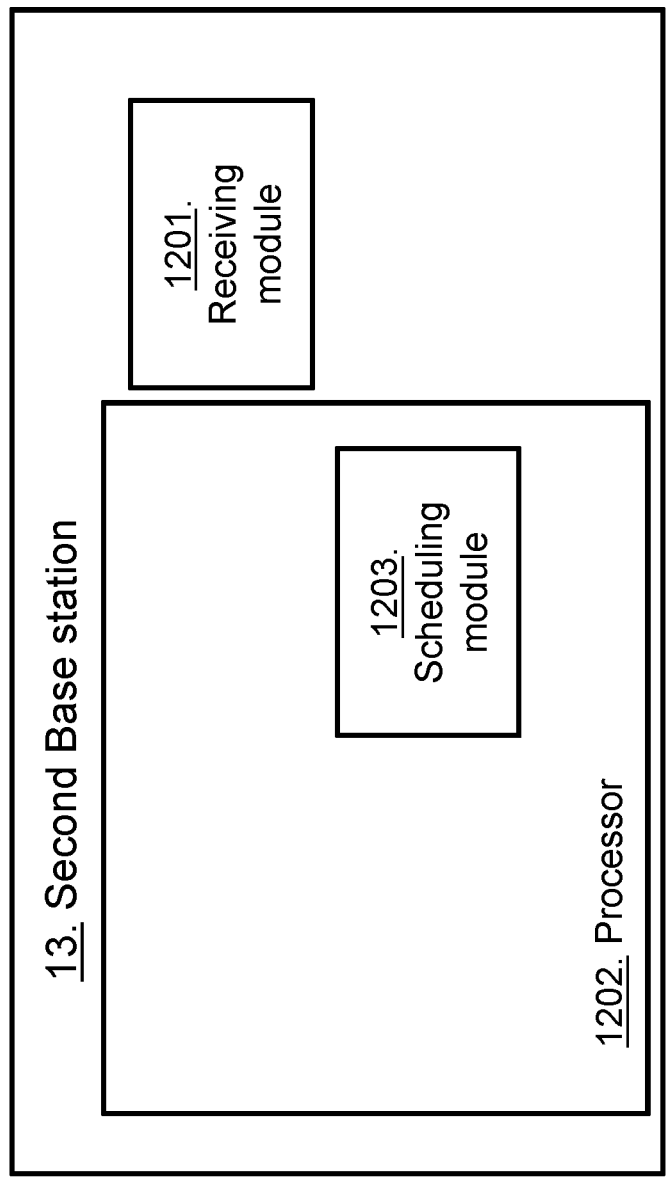
FIG. 12 shows a block diagram depicting a second base station according to embodiments herein.

FIG. 12 is a block diagram depicting the second base station 13, for scheduling TDD uplink and/or downlink subframes for the wireless terminal 10. The wireless terminal 10 is in dual connectivity with the first cell 11 served by the first base station 12 and the second cell 14 served by the second base station 13.

The second base station 13 may comprise a receiving module 1201 and/or a processor 1202. The second base station 13, the receiving module 1201 and/or the processor 1202 is configured to receive from the first base station 12, a scheduling instruction for an identified subframe in which an uplink/downlink scheduling conflict will occur between the first cell 11 and the second cell 14 due to a difference between a TDD configuration of the first cell and a TDD configuration of the second cell. The scheduling instruction is based on at least one scheduling parameter. The at least one scheduling parameter may comprise a buffer state of the first base station 12 for serving the first cell and/or a buffer state of the second base station 13 for serving the second cell, and the scheduling instruction may indicate scheduling of the identified subframe according to the TDD configuration of the one of the first and second cells, for which the respective buffer state indicates a larger buffer level or amount of data to be processed or sent as compared to the respective buffer state for serving the other one of the first and second cells. The buffer state may in some embodiments be an indication of an amount of data for transmissions from the wireless terminal 10.

The at least one scheduling parameter may comprise an uplink resource request of or made to the first base station 12 serving the first cell 11 and/or an uplink resource request of or made to the second base station 13 serving the second cell 14. The scheduling instruction may then indicate scheduling of the identified subframe according to the TDD configuration of the one of the first and second cells, for which the respective uplink resource request is a larger one of the uplink resource requests or if such request surpasses a threshold. The uplink resource requests may have been made by the wireless terminal 10.

The at least one scheduling parameter may comprise an upcoming uplink allocation made according to any one of the TDD configurations of the first and second cells in the identified subframe, wherein the scheduling instruction indicates scheduling of or for the identified subframe to receive or carry only uplink communications. Therefore, downlink communications to the wireless terminal 10 are restricted or prevented in the identified subframe.

The at least one scheduling parameter may comprise an identity of a preferred base station, said identity of the preferred base station being determined from the first and second base stations; and the scheduling instruction indicates scheduling of or for the identified subframe according to the TDD configuration of a respective one of the first and second cells served by the preferred base station. The identity of the preferred base station may for example be determined from the identities of the first and second base stations. The identity of the preferred base station may further be statically determined. Alternatively, the identity of the preferred base station may be dynamically determined, and the determination of the identity of the preferred base station may be based on any one or more of: a location of the wireless terminal 10, base station traffic loads, and/or a type of transmitted data.

The at least one scheduling parameter may in some embodiments comprise a predetermined preference scheduling, wherein one of the first base station 12 and the second base station 13 is a preferred base station based on the predetermined preference scheduling. Then the scheduling instruction may provide or prescribe scheduling of or for the identified subframe according to the TDD configuration of a respective one of the first and second cells served by the preferred base station. The predetermined preference scheduling may be based on a round robin or proportional fair scheduling mechanism.

The second base station 13 may comprise a scheduling module 1203. The second base station 13, the scheduling module 1203 and/or the processor 1202 is configured to schedule the identified subframe according to the received scheduling instruction.

Figure 13:
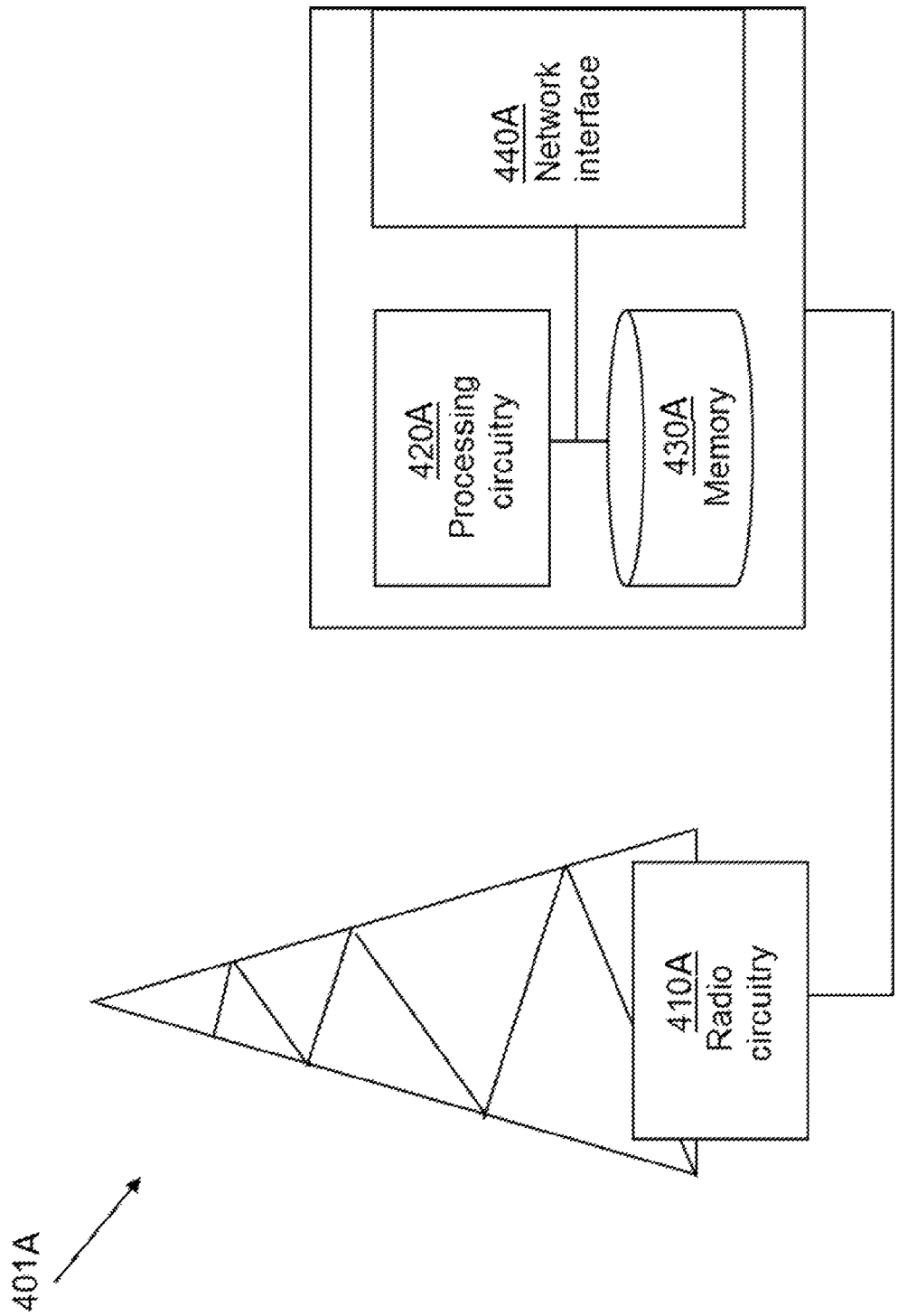
FIG. 13 shows a block diagram depicting a first base station according to embodiments herein.

FIG. 13 illustrates an example node configuration of a first base station, anchor node, or eNB 401A which may perform some of the example embodiments described herein. The base station 401A may comprise radio circuitry or a communication port 410A that may be configured to receive and/or transmit communication data, instructions, and/or messages. It should be appreciated that the radio circuitry or communication port 410A may comprise any number of transceiving, receiving, and/or transmitting units or circuitry. It should further be appreciated that the radio circuitry or communication port 410A may be in the form of any input or output communications port known in the art. The radio circuitry or communication port 410A may comprise RF circuitry and baseband processing circuitry (not shown).

The base station 401A may also comprise a processing unit or circuitry 420A which may be configured to provide the scheduling for a subframe in the presence of an uplink/downlink conflict, as described herein. The processing circuitry 420A may be any suitable type of computation unit, for example, a microprocessor, digital signal processor (DSP), field programmable gate array (FPGA), or application specific integrated circuit (ASIC), or any other form of circuitry. The base station 401A may further comprise a memory unit or circuitry 430A which may be any suitable type of computer readable memory and may be of volatile and/or non-volatile type. The memory 430A may be configured to store received, transmitted, and/or measured data, device parameters, communication priorities, and/or executable program instructions, e.g., scheduling instructions. The memory 430A may also be configured to store a maintained list of cells or assisting base stations serving a particular wireless terminal. The base station 401A comprises a network interface 440A towards a different base station.

Figure 14:
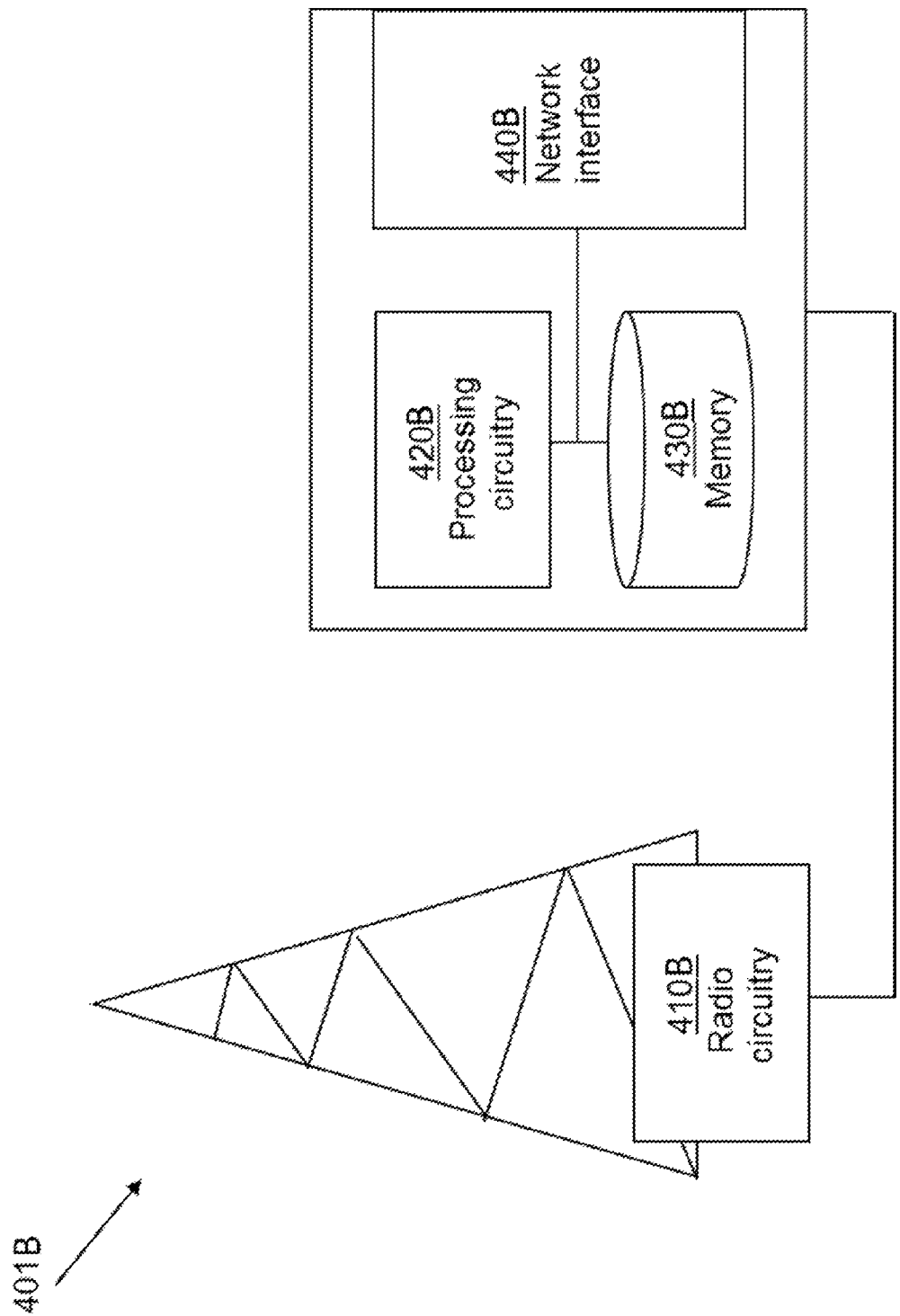
FIG. 14 shows a block diagram depicting a second base station according to embodiments herein.

FIG. 14 illustrates an example node configuration of a second base station, assisting node, or eNB 401B which may perform some of the example embodiments described herein. The base station 401B may comprise radio circuitry or a communication port 410B that may be configured to receive and/or transmit communication data, instructions, and/or messages. It should be appreciated that the radio circuitry or communication port 410B may comprise any number of transceiving, receiving, and/or transmitting units or circuitry. It should further be appreciated that the radio circuitry or communication port 410B may be in the form of any input or output communications port known in the art. The radio circuitry or communication port 410B may comprise RF circuitry and baseband processing circuitry (not shown).

The base station 401B may also comprise a processing unit or circuitry 420B which may be configured to provide scheduling for a subframe in the presence of an UL/DL conflict, as described herein. The processing circuitry 420B may be any suitable type of computation unit, for example, a microprocessor, digital signal processor (DSP), field programmable gate array (FPGA), or application specific integrated circuit (ASIC), or any other form of circuitry. The base station 401B may further comprise a memory unit or circuitry 430B which may be any suitable type of computer readable memory and may be of volatile and/or non-volatile type. The memory 430B may be configured to store received, transmitted, and/or measured data, device parameters, communication priorities, and/or executable program instructions, e.g., scheduling instructions. The base station 401B comprises a network interface 440B towards a different base station.

Abbreviations

| Abbreviation | Explanation |
|---|---|
| CoMP | Coordinated Multipoint Transmission |
| DL | Downlink |
| eNB | Enhanced Node B |

-continued

| Abbreviation | Explanation |
|---|---|
| FDD | Frequency Division Duplex |
| GSM | Global System for Mobile Communications |
| HSPA | High-Speed Packet Access |
| LPN | Low Power Nodes |
| LTE | Long Term Evolution |
| PDCCH | Physical Downlink Control Channel |
| SF | Subframe |
| TDD | Time Division Duplex |
| TDM | Time Division Multiplexing |
| UCI | Uplink Control Information |
| UE | User Equipment |
| UMB | Ultra-Mobile Broadband |
| UL | Uplink |
| WCDMA | Wideband Code Division Multiple Access |
| WiFi | Wireless Fidelity |
| WiMax | Worldwide Interoperability for Microwave Access |

It should be noted that although terminology from 3GPP LTE has been used herein to explain the example embodiments, this should not be seen as limiting the scope of the example embodiments to only the aforementioned system. Other wireless systems, comprising HSPA, WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatuses, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A wireless terminal or user equipment (UE), being terms used herein, are to be broadly interpreted to comprise a radiotelephone having ability for Internet/intranet access, web browser, organizer, calendar, a camera, e.g., video and/or still image camera, a sound recorder, e.g., a microphone, and/or global positioning system (GPS) receiver; a personal communications system (PCS) user equipment that may combine a cellular radiotelephone with data processing; a personal digital assistant (PDA) that can comprise a radiotelephone or wireless communication system; a laptop; a camera, e.g., video and/or still image camera, having communication ability; and any other computation or communication device capable of transceiving, such as a personal computer, a home entertainment system, a television, etc. It should be appreciated that the term user equipment may also comprise any number of connected devices, wireless terminals or machine-to-machine devices.

It should further be appreciated that the term dual connectivity should not be limited to a user equipment or wireless terminal being connected to only two base stations. In dual connectivity a wireless terminal may be connected to any number of base stations.

The various example embodiments described herein are described in the general context of method steps or processes, which may be implemented in one aspect by a computer program product, embodied in a computer-readable medium, comprising computer-executable instructions, such as program code, executed by computers in networked environments. A computer-readable medium may comprise removable and non-removable storage devices comprising, but not limited to, Read Only Memory (ROM), Random Access Memory (RAM), compact discs (CDs), digital versatile discs (DVD), etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method, performed by a first base station, for handling scheduling of Time Division Duplex (TDD) uplink or downlink subframes for a wireless terminal, wherein the wireless terminal is in dual connectivity with a first cell served by said first base station and a second cell served by a second base station, the method further comprising:
 identifying a subframe in which an uplink/downlink scheduling conflict will occur between the first cell and the second cell due to a difference between a TDD configuration of the first cell and a TDD configuration of the second cell;
 determining a scheduling for the identified subframe based on at least one scheduling parameter; and
 sending, to the second base station, a scheduling instruction comprising the determined scheduling for the identified subframe.

2. The method according to claim 1, wherein the identifying further comprises analyzing the TDD configuration of each cell, including said first and second cells, serving the wireless terminal, wherein a frequency of the analyzing is dependent on a reconfiguration rate of each respective cell serving the wireless terminal.

3. The method according to claim 1, further comprising maintaining a list of cells serving the wireless terminal and/or of base stations corresponding to the cells.

4. The method according to claim 1, wherein the at least one scheduling parameter comprises a buffer state of the first base station for serving the first cell and/or a buffer state of the second base station for serving the second cell, and the determining further comprises
 scheduling the identified subframe according to the TDD configuration of the one of the first and second cells, for which the respective buffer state indicates a larger buffer level or amount of data to be processed or sent as compared to the respective buffer state for serving the other one of the first and second cells.

5. The method according to claim 1, wherein the at least one scheduling parameter comprises an uplink resource request of the first base station serving the first cell and/or an uplink resource request of the second base station serving the second cell, and the determining further comprises:
 scheduling the identified subframe according to the TDD configuration of the one of the first and second cells, for which the respective uplink resource request is a larger one of the uplink resource requests or if such request surpasses a threshold.

6. The method according to claim 1, wherein the at least one scheduling parameter comprises an upcoming uplink allocation made according to any one of the TDD configurations of the first and second cells in the identified subframe, and the determining further comprises:
 scheduling the identified subframe to receive only uplink communications.

7. The method according to claim 1, wherein the at least one scheduling parameter comprises an identity of a preferred base station, and the determining further comprises:
 determining, from the first and second base stations, the identity of the preferred base station; and
 scheduling the identified subframe according to the TDD configuration of a respective one of the first and second cells served by the preferred base station.

8. The method according to claim 7, wherein the identity of the preferred base station is statically determined.

9. The method according to claim 7, wherein the identity of the preferred base station is dynamically determined, and said determining of the identity of the preferred base station is based on any one or more of: a location of the wireless terminal, base station traffic loads, and/or a type of transmitted data.

10. The method according to claim 1, wherein the at least one scheduling parameter comprises a predetermined preference scheduling, wherein one of the first base station and the second base station is a preferred base station based on the predetermined preference scheduling, and the determining further comprises:
 determining the preferred base station according to the predetermined preference scheduling; and
 scheduling the identified subframe according to the TDD configuration of a respective one of the first and second cells served by the preferred base station.

11. The method according to claim 10, wherein the predetermined preference scheduling is based on a round robin or proportional fair scheduling mechanism.

12. A first base station, for handling scheduling of Time Division Duplex (TDD) uplink or downlink subframes for a wireless terminal, wherein the wireless terminal is in dual connectivity with a first cell served by said first base station and a second cell served by a second base station, the first base station configured to:
 identify a subframe in which an uplink/downlink scheduling conflict will occur between the first cell and the second cell due to a difference between a TDD configuration of the first cell and a TDD configuration of the second cell;

determine a scheduling for the identified subframe based on at least one scheduling parameter; and send, to the second base station, a scheduling instruction comprising the determined scheduling for the identified subframe.

13. The first base station according to claim 12, wherein the first base station is configured to identify the subframe by further being configured to analyze the TDD configuration of each cell, including said first and second cells, serving the wireless terminal, and wherein the first base station is further configured to analyze the TDD configuration in a frequency that is dependent on a reconfiguration rate of each respective cell serving the wireless terminal.

14. The first base station according to claim 12, further being configured to maintain a list of cells serving the wireless terminal and/or of base stations corresponding to the cells.

15. The first base station according to claim 12, wherein the at least one scheduling parameter comprises a buffer state of the first base station for serving the first cell and/or a buffer state of the second base station for serving the second cell, and the first base station is configured to determine the scheduling by further being configured to schedule the identified subframe according to the TDD configuration of the one of the first and second cells, for which the respective buffer state indicates a larger buffer level or amount of data to be processed or sent as compared to the respective buffer state for serving the other one of the first and second cells.

16. The first base station according to claim 12, wherein the at least one scheduling parameter comprises an uplink resource request of the first base station serving the first cell and/or an uplink resource request of the second base station serving the second cell, and the first base station is configured to determine the scheduling by further being configured to schedule the identified subframe according to the TDD configuration of the one of the first and second cells, for which the respective uplink resource request is a larger one of the uplink resource requests or if such request surpasses a threshold.

17. The first base station according to claim 12, wherein the at least one scheduling parameter comprises an upcoming uplink allocation made according to any one of the TDD configurations of the first and second cells in the identified subframe, and the first base station is configured to determine the scheduling by further being configured to schedule the identified subframe to receive only uplink communications.

18. The first base station according to claim 12 wherein the at least one scheduling parameter comprises an identity of a preferred base station, and the first base station is configured to determine the scheduling by further being configured to determine, from the first and second base stations, the identity of the preferred base station; and to schedule the identified subframe according to the TDD configuration of a respective one of the first and second cells served by the preferred base station.

19. The first base station according to claim 18, wherein the first base station is configured to determine the identity of the preferred base station statically.

20. The first base station according to claim 18, wherein the first base station is configured to determine the identity of the preferred base station dynamically and based on any one or more of: a location of the wireless terminal, base station traffic loads, and/or a type of transmitted data.

21. The first base station according to claim 12, wherein the at least one scheduling parameter comprises a predetermined preference scheduling, wherein one of the first base station and the second base station is a preferred base station based on the predetermined preference scheduling, and the first base station is configured to determine the scheduling by being configured to determine the identity of the preferred base station according to the predetermined preference scheduling; and to schedule the identified subframe according to the TDD configuration of a respective one of the first and second cells served by the preferred base station.

22. The first base station according to claim 21, wherein the predetermined preference scheduling is based on a round robin or proportional fair scheduling mechanism.

23. A method, performed by a second base station, for scheduling Time Division Duplex (TDD) uplink or downlink subframes for a wireless terminal, wherein the wireless terminal is in dual connectivity with a first cell served by a first base station and a second cell served by the second base station, the method comprising:

receiving, from the first base station, a scheduling instruction for an identified subframe in which an uplink/downlink scheduling conflict will occur between the first cell and the second cell due to a difference between a TDD configuration of the first cell and a TDD configuration of the second cell, said scheduling instruction being based on at least one scheduling parameter; and scheduling the identified subframe according to the received scheduling instruction.

24. The method according to claim 23, wherein the at least one scheduling parameter comprises a buffer state of the first base station for serving the first cell and/or a buffer state of the second base station for serving the second cell, wherein the scheduling instruction indicates scheduling of the identified subframe according to the TDD configuration of the one of the first and second cells, for which the respective buffer state indicates a larger buffer level or amount of data to be processed or sent as compared to the respective buffer state for serving the other one of the first and second cells.

25. The method according to claim 23, wherein the at least one scheduling parameter comprises an uplink resource request of the first base station serving the first cell and/or an uplink resource request of the second base station serving the second cell, wherein the scheduling instruction indicates scheduling of the identified subframe according to the TDD configuration of the one of the first and second cells, for which the respective uplink resource request is a larger one of the uplink resource requests or if such request surpasses a threshold.

26. The method according to claim 23, wherein the at least one scheduling parameter comprises an upcoming uplink allocation made according to any one of the TDD configurations of the first and second cells in the identified subframe, wherein the scheduling instruction indicates scheduling of the identified subframe to receive only uplink communications.

27. The method according to claim 23, wherein the at least one scheduling parameter comprises an identity of a preferred base station, said identity of the preferred base station being determined from the first and second base stations; and the scheduling instruction indicates scheduling of the identified subframe according to the TDD configuration of a respective one of the first and second cells served by the preferred base station.

28. The method according to claim 27, wherein the identity of the preferred base station is statically determined.

29. The method according to claim 27, wherein the identity of the preferred base station is dynamically determined, and wherein the identity of the preferred base station is based on any one or more of: a location of the wireless terminal, base station traffic loads, and/or a type of transmitted data.

30. The method according to claim 23, wherein the at least one scheduling parameter comprises a predetermined preference scheduling, wherein one of the first base station and the second base station is a preferred base station based on the predetermined preference scheduling, wherein the scheduling instruction provides scheduling of the identified subframe according to the TDD configuration of a respective one of the first and second cells served by the preferred base station.

31. The method according to claim 30, wherein the predetermined preference scheduling is based on a round robin or proportional fair scheduling mechanism.

32. A second base station, for scheduling Time Division Duplex (TDD) uplink or downlink subframes for a wireless terminal, wherein the wireless terminal is in dual connectivity with a first cell served by a first base station and a second cell served by the second base station, the second base station configured to:
receive, from the first base station, a scheduling instruction for an identified subframe in which an uplink/downlink scheduling conflict will occur between the first cell and the second cell due to a difference between a TDD configuration of the first cell and a TDD configuration of the second cell, said scheduling instruction being based on at least one scheduling parameter; and
schedule the identified subframe according to the received scheduling instruction.

33. The second base station according to claim 32, wherein the at least one scheduling parameter comprises a buffer state of the first base station for serving the first cell and/or a buffer state of the second base station for serving the second cell, wherein the scheduling instruction indicates scheduling of the identified subframe according to the TDD configuration of the one of the first and second cells, for which the respective buffer state indicates a larger buffer level or amount of data to be processed or sent as compared to the respective buffer state for serving the other one of the first and second cells.

34. The second base station according to claim 32, wherein the at least one scheduling parameter comprises an uplink resource request of the first base station serving the first cell and/or an uplink resource request of the second base station serving the second cell, wherein the scheduling instruction indicates scheduling of the identified subframe according to the TDD configuration of the one of the first and second cells, for which the respective uplink resource request is a larger one of the uplink resource requests or if such request surpasses a threshold.

35. The second base station according to claim 32, wherein the at least one scheduling parameter comprises an upcoming uplink allocation made according to any one of the TDD configurations of the first and second cells in the identified subframe, wherein the scheduling instruction indicates scheduling of the identified subframe to receive only uplink communications.

36. The second base station according to claim 32, wherein the at least one scheduling parameter comprises an identity of a preferred base station, said identity of the preferred base station being determined from the first and second base stations; and the scheduling instruction indicates scheduling of the identified subframe according to the TDD configuration of a respective one of the first and second cells served by the preferred base station.

37. The second base station according to claim 36, wherein the identity of the preferred base station is statically determined.

38. The second base station according to claim 36, wherein the identity of the preferred base station is dynamically determined, and wherein the identity of the preferred base station is based on any one or more of: a location of the wireless terminal (10), base station traffic loads, and/or a type of transmitted data.

39. The second base station according to claim 32, wherein the at least one scheduling parameter comprises a predetermined preference scheduling, wherein one of the first base station and the second base station is a preferred base station based on the predetermined preference scheduling, wherein the scheduling instruction provides scheduling of the identified subframe according to the TDD configuration of a respective one of the first and second cells served by the preferred base station.

40. The second base station according to claim 39, wherein the predetermined preference scheduling is based on a round robin or proportional fair scheduling mechanism.

* * * * *

UNITED STATES PATENT AND TRADEMARK OFFICE
CERTIFICATE OF CORRECTION

PATENT NO. : 9,860,907 B2
APPLICATION NO. : 14/910734
DATED : January 2, 2018
INVENTOR(S) : Behravan et al.

Page 1 of 1

It is certified that error appears in the above-identified patent and that said Letters Patent is hereby corrected as shown below:

In the Drawings

In Fig. 5, Sheet 5 of 14, delete " 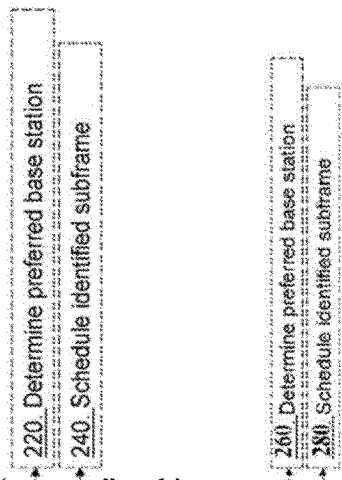 " and insert -- 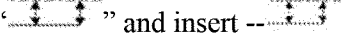 --, therefor.

In the Claims

In Column 20, Line 5, in Claim 4, delete "comprises" and insert -- comprises: --, therefor.

In Column 21, Line 53, in Claim 18, delete "claim 12" and insert -- claim 12, --, therefor.

In Column 24, Line 35, in Claim 38, delete "terminal (10)," and insert -- terminal, --, therefor.

Signed and Sealed this
Eighteenth Day of September, 2018

Andrei Iancu
*Director of the United States Patent and Trademark Office*